US010868329B2

(12) United States Patent
Mimura et al.

(10) Patent No.: US 10,868,329 B2
(45) Date of Patent: Dec. 15, 2020

(54) ALL SOLID STATE SECONDARY BATTERY, SOLID ELECTROLYTE COMPOSITION USED THEREFOR, ELECTRODE SHEET FOR BATTERY USING THE SAME, AND METHOD FOR MANUFACTURING ELECTRODE SHEET FOR BATTERY AND ALL SOLID STATE SECONDARY BATTERY

(71) Applicant: FUJIFILM Corporation, Tokyo (JP)

(72) Inventors: Tomonori Mimura, Kanagawa (JP); Hiroaki Mochizuki, Kanagawa (JP); Masaomi Makino, Kanagawa (JP); Katsuhiko Meguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 154 days.

(21) Appl. No.: 15/635,571

(22) Filed: Jun. 28, 2017

(65) Prior Publication Data

US 2017/0301949 A1 Oct. 19, 2017

Related U.S. Application Data

(63) Continuation of application No. PCT/JP2016/052819, filed on Jan. 29, 2016.

(30) Foreign Application Priority Data

Feb. 12, 2015 (JP) ................................ 2015-025078

(51) Int. Cl.
*H01M 10/0562* (2010.01)
*H01M 4/139* (2010.01)
(Continued)

(52) U.S. Cl.
CPC ..... *H01M 10/0562* (2013.01); *H01M 4/0404* (2013.01); *H01M 4/13* (2013.01);
(Continued)

(58) Field of Classification Search
CPC .. H01M 10/0526; H01M 4/0404; H01M 4/13; H01M 4/139; H01M 4/36; H01M 4/603; H01M 4/62; H01M 4/622; H01M 10/052
See application file for complete search history.

(56) References Cited

U.S. PATENT DOCUMENTS 6,750,352 B2 * 6/2004 Ono .................... H01G 9/2009 548/341.5
2012/0115028 A1 5/2012 Ueno et al.
(Continued)

FOREIGN PATENT DOCUMENTS

JP 2011-14387 A 1/2011
JP 2011-134807 A 7/2011
(Continued)

OTHER PUBLICATIONS

Communication dated Nov. 13, 2018 from the Japanese Patent Office in counterpart Application No. 2016-574735.
(Continued)

*Primary Examiner* — Helen Oi K Conley
(74) *Attorney, Agent, or Firm* — Sughrue Mion, PLLC

(57) ABSTRACT

To provide an all solid state secondary battery capable of realizing favorable bonding properties and a favorable ion conductivity.
Provided is an all solid state secondary battery having a structure in which an electrode layer is located between a collector and an inorganic solid electrolyte layer, in which the electrode layer contains an inorganic solid electrolyte having a conductivity of ions of metals belonging to Group I or II of the periodic table, an active material, and a specific polymer described below,
specific polymer: a polymer having at least one specific functional group selected from acidic functional groups, amide groups, or hydroxyl groups.

18 Claims, 2 Drawing Sheets

(51) Int. Cl.

| | |
|---|---|
| ***H01M 4/13*** | (2010.01) |
| ***H01M 4/62*** | (2006.01) |
| ***H01M 10/052*** | (2010.01) |
| ***H01M 4/04*** | (2006.01) |
| ***H01M 4/36*** | (2006.01) |
| ***H01M 4/60*** | (2006.01) |

(52) U.S. Cl.
CPC ............ *H01M 4/139* (2013.01); *H01M 4/36* (2013.01); *H01M 4/602* (2013.01); *H01M 4/62* (2013.01); *H01M 4/622* (2013.01); *H01M 10/052* (2013.01); *H01M 2300/0068* (2013.01)

(56) References Cited

U.S. PATENT DOCUMENTS

| | | | | |
|---|---|---|---|---|
| 2014/0178756 | A1* | 6/2014 | Ishii ...................... | H01M 4/622 429/211 |
| 2016/0204465 | A1 | 7/2016 | Mimura et al. | |

FOREIGN PATENT DOCUMENTS

| | | | |
|---|---|---|---|
| JP | 2012-99315 | A | 5/2012 |
| JP | 2012-104270 | A | 5/2012 |
| JP | 2012-178256 | A | 9/2012 |
| JP | 2012-243476 | A | 12/2012 |
| JP | 2013-008611 | A | 1/2013 |
| JP | 2015-88486 | A | 5/2015 |
| JP | 2015-088486 | A | 5/2015 |
| WO | 2013/080989 | A1 | 6/2013 |

OTHER PUBLICATIONS

Communication dated Nov. 14, 2017 from the Japanese Patent Office in counterpart Application No. 2016-574735.

International Search Report for PCT/JP2016/052819 dated May 10, 2016 [PCT/ISA/210].

Notice of Reasons for Refusal dated Jun. 18, 2019 in counterpart application No. 2016-574735.

* cited by examiner

ALL SOLID STATE SECONDARY BATTERY, SOLID ELECTROLYTE COMPOSITION USED THEREFOR, ELECTRODE SHEET FOR BATTERY USING THE SAME, AND METHOD FOR MANUFACTURING ELECTRODE SHEET FOR BATTERY AND ALL SOLID STATE SECONDARY BATTERY

CROSS-REFERENCE TO RELATED APPLICATIONS

This application is a Continuation of PCT International Application No. PCT/JP2016/052819 filed on Jan. 29, 2016, which claims priority under 35 U.S.C. § 119 (a) to Japanese Patent Application No. JP2015-025078 filed in Japan on Feb. 12, 2015. Each of the above applications is hereby expressly incorporated by reference, in its entirety, into the present application.

BACKGROUND OF THE INVENTION

1. Field of the Invention

The present invention relates to an all solid state secondary battery, a solid electrolyte composition used therefor, an electrode sheet for a battery using the same, and a method for manufacturing an electrode sheet for a battery and an all solid state secondary battery.

2. Description of the Related Art

For lithium ion batteries, electrolytic solutions are being used. Attempts are underway to produce all solid state secondary batteries in which all constituent materials are solid by replacing electrolytic solutions with solid electrolytes. Reliability is an advantage of techniques of using inorganic solid electrolytes. To electrolytic solutions being used for lithium ion secondary batteries, flammable materials such as carbonate-based solvents are applied as media. In spite of the employment of a variety of safety measures, there may be a concern that disadvantages may be caused during overcharging and the like, and there is a demand for additional efforts. All solid state secondary batteries in which non-flammable electrolytes can be used are considered as a fundamental solution thereof.

Another advantage of all solid state secondary batteries is the suitability for increasing energy density by means of the stacking of electrodes. Specifically, it is possible to produce batteries having a structure in which electrodes and electrolytes are directly arranged in series. At this time, metal packages sealing battery cells and copper wires or bus-bars connecting battery cells may not be provided, and thus the energy density of batteries can be significantly increased. In addition, favorable compatibility with positive electrode materials capable of increasing potentials and the like can be considered as advantages.

From the viewpoint of the respective advantages described above, active development of next-generation lithium ion secondary batteries is underway (New Energy and Industrial Technology Development Organization (N EDO), Fuel Cell and Hydrogen Technologies Development Department, Electricity Storage Technology Development Section, "NEDO 2013 Roadmap for the Development of Next Generation Automotive Battery Technology" (August, 2013)). As one of such attempts, efforts are concentrated on the materials or structures of solid electrolyte layers or electrode layers. JP2013-008611A discloses an example in which polyoxyethylene lauryl ether is applied as an emulsifier to an acrylic resin. JP2012-178256A discloses an example in which hydrogenated butadiene rubber or a fluorine-based resin is used. JP2012-104270A discloses an example in which the volume ratio between a solid electrolyte material and an electrode active material or the porosity thereof is adjusted.

SUMMARY OF THE INVENTION

The techniques disclosed by JP2013-008611A, JP2012-178256A, and JP2012-104270A are not yet enough to cope with the need for additional performance improvement, and additional improvement is desired.

Therefore, an object of the present invention is to provide an all solid state secondary battery capable of realizing favorable bonding properties and a favorable ion conductivity, a solid electrolyte composition used therefor, an electrode sheet for a battery using the same, and a method for manufacturing an electrode sheet for a battery and an all solid state secondary battery.

The above-described object is achieved by the following means.

[1] An all solid state secondary battery having a structure in which an electrode layer is located between a collector and an inorganic solid electrolyte layer, in which the electrode layer contains an inorganic solid electrolyte having a conductivity of ions of metals belonging to Group I or II of the periodic table, an active material, and a specific polymer described below, specific polymer: a polymer having at least one specific functional group selected from acidic functional groups, amide groups, or hydroxyl groups.

[2] The all solid state secondary battery according to [1], in which the specific functional group is an acidic functional group.

[3] The all solid state secondary battery according to [1] or [2], in which, in the electrode layer, a volume ratio $V_E/V_{SE}$ of a total volume $V_E$ of the active material to a total volume $V_{SE}$ of the inorganic solid electrolyte is set to change from the collector through the inorganic solid electrolyte layer.

[4] The all solid state secondary battery according to any one of [1] to [3], in which, in the electrode layer, the volume ratio $V_E/V_{SE}$ of the total volume $V_E$ of the active material to the total volume $V_{SE}$ of the inorganic solid electrolyte is set to increase from the inorganic solid electrolyte layer side toward the collector side.

[5] The all solid state secondary battery according to any one of [1] to [4], in which the specific polymer has an acidic functional group and contains 3 to 50% by mass of a repeating unit having an acidic functional group in terms of an acid equivalent. The above proportion in terms of the acid equivalent refers to a value obtained by multiplying a valence of the acidic functional group by a proportion of the corresponding repeating unit.

[6] The all solid state secondary battery according to any one of [1] to [5], in which the acidic functional group is a carboxyl group, a sulfonic acid group, a phosphoric acid group, or a phosphonic acid group.

[7] The all solid state secondary battery according to any one of [1] to [6], in which the specific polymer is selected from acrylic resins and urethane resins.

[8] The all solid state secondary battery according to any one of [1] to [7], in which the specific polymer has a particulate shape having a volume-average particle diameter of 0.01 to 20 μm.

[9] The all solid state secondary battery according to any one of [1] to [8], in which a thickness of the electrode layer is 5μm or more and 1,000 μm or less.

[10] The all solid state secondary battery according to any one of [1] to [9], in which the specific polymer has a repeating unit derived from a macromonomer having a weight-average molecular weight of 1,000 or more as a side chain component.

[11] The all solid state secondary battery according to any one of [1] to [10], in which the specific polymer includes a repeating unit derived from a monomer selected from (meth) acrylic acid monomers, (meth)acrylic acid ester monomers, (meth)acrylic acid amide monomers, and (meth)acrylonitrile.

[12] The all solid state secondary battery according to any one of [1] to [11], in which a content of the specific polymer in the electrode layer is 0.1 to 20% by mass.

[13] A solid electrolyte composition which is applied to formation of electrode layers in all solid state secondary batteries, comprising: an inorganic solid electrolyte having a conductivity of ions of metals belonging to Group I or II of the periodic table; an active material; and a specific polymer described below, specific polymer: a polymer having at least one specific functional group selected from acidic functional groups, amide groups, or hydroxyl groups.

[14] The solid electrolyte composition according to [13], in which the specific polymer contains an acidic functional group and contains 3 to 50% by mass of a repeating unit having an acidic functional group in terms of an acid equivalent. The above proportion in terms of the acid equivalent refers to a value obtained by multiplying a valence of the acidic functional group by a proportion of the corresponding repeating unit.

[15] The solid electrolyte composition according to [13] or [14], in which the acidic functional group is a carboxyl group, a sulfonic acid group, a phosphoric acid group, or a phosphonic acid group.

[16] The solid electrolyte composition according to any one of [13] to [15], in which the specific polymer is selected from acrylic resins and urethane resins.

[17] The solid electrolyte composition according to any one of [13] to [16], in which the specific polymer has a particulate shape having a volume-average particle diameter of 0.01 to 20 μm.

[18] The solid electrolyte composition according to any one of [13] to [17], in which a concentration of solid components is 1% by mass or more and 70% by mass or less of a total amount of the solid electrolyte composition.

[19] A method for manufacturing an electrode sheet for a battery, comprising: applying the solid electrolyte composition according to any one of [13] to [18] onto a collector to form a film.

[20] The method for manufacturing an electrode sheet for a battery according to [19], further comprising: eccentrically locating the active material in the bottom collector side and forming an inorganic solid electrolyte layer on the electrode layer by the application of the solid electrolyte composition to obtain a structure of the electrode layer in which a volume ratio $V_E/V_{SE}$ of a total volume $V_E$ of the active material to a total volume $V_{SE}$ of the inorganic solid electrolyte in the electrode layer is increased from the inorganic solid electrolyte layer side toward the collector side.

[21] A method for manufacturing an all solid state secondary battery, in which an all solid state secondary battery is manufactured using the method for manufacturing an electrode sheet for a battery according to [19] or [20].

[22] An electrode sheet for a battery, in which the solid electrolyte composition according to any one of [13] to [18] is applied onto a collector to form a film.

[23] An all solid state secondary battery comprising: the electrode sheet for a battery according to [22].

In the present specification, when there are a plurality of substituents or linking groups represented by specific symbols or a plurality of substituents or the like are simultaneously or selectively specified (similarly, when the number of substituents is specified), the respective substituents and the like may be identical to or different from each other. In addition, when coming close to each other, a plurality of substituents or the like may be bonded or condensed to each other and form a ring.

According to the all solid state secondary battery of the present invention, it is possible to realize favorable bonding properties and a favorable ion conductivity. Furthermore, according to the solid electrolyte composition and the electrode sheet for a battery of the present invention, it is possible to manufacture all solid state secondary batteries having excellent performance described above. Furthermore, according to the manufacturing method of the present invention, it is possible to favorably manufacture the electrode sheet for a battery and the all solid state secondary battery of the present invention.

The above-described and other characteristics and advantages of the present invention will be further clarified by the following description with appropriate reference to the accompanying drawings.

DESCRIPTION OF THE PREFERRED EMBODIMENTS

Hereinafter, a preferred embodiment of the present invention will be described, and first, an example of an all solid state secondary battery which is a preferred application aspect thereof will be described.

Figure 1:
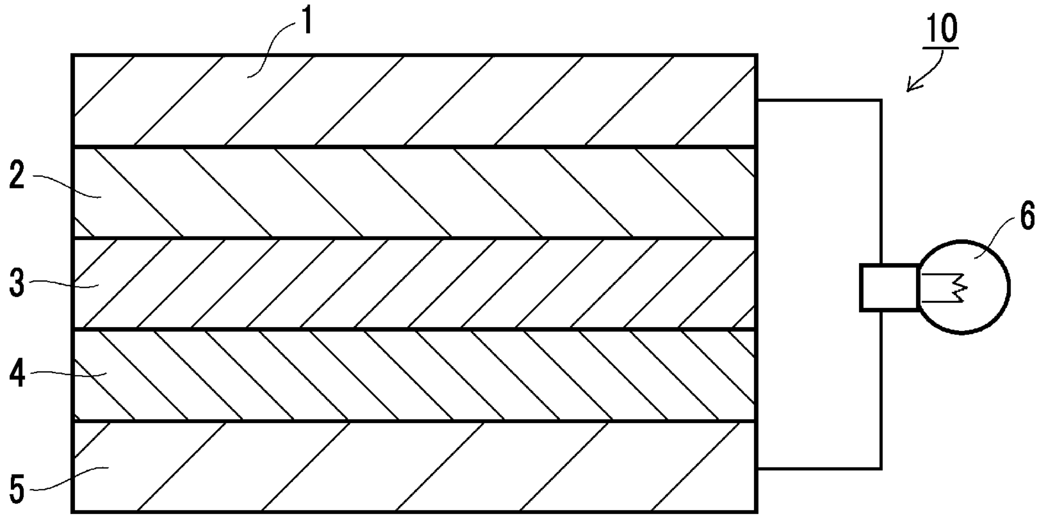
FIG. 1 is a schematic cross-sectional view illustrating an all solid state lithium ion secondary battery according to a preferred embodiment of the present invention.

FIG. 1 is a schematic cross-sectional view illustrating an all solid state secondary battery (lithium ion secondary battery) according to a preferred embodiment of the present invention. When seen from the negative electrode side, an all solid state secondary battery 10 of the present embodiment has a negative electrode collector 1, a negative electrode active material layer 2 (electrode layer), a solid electrolyte layer 3, a positive electrode active material layer 4 (electrode layer), and a positive electrode collector 5 in this order. The respective layers have a structure in which the layers are in contact with each other and laminated together. When the above-described structure is employed, during charging, electrons ($e^-$) are supplied to the negative electrode side, and lithium ions ($Li^+$) are accumulated on the negative electrode side. On the other hand, during discharging, the lithium ions ($Li^+$) accumulated on the negative electrode side return to the positive electrode side, and electrons are supplied to an operation portion 6. In an example illustrated in the drawing, an electric bulb is employed as the operation portion 6 and is lighted by discharging. A solid electrolyte composition is preferably used as a constituent material of the negative electrode active material layer, the positive electrode active material layer, or the solid electrolyte layer and, furthermore, is preferably used as a constituent material of all of the solid electrolyte layer, the positive electrode active material layer, and the negative electrode active material layer. Meanwhile, in some cases, the negative electrode active material layer and the positive electrode active material layer will be collectively referred to as "electrode active material layers" or "electrode layers". In addition, in the present specification, unless particularly otherwise described, the "solid electrolyte layer" is the same as "inorganic solid electrolyte layer".

The thicknesses of the positive electrode active material layer 4, the solid electrolyte layer 3, and the negative electrode active material layer 2 are not particularly limited and can be arbitrarily determined depending on intended battery applications. In order to more significantly exhibit the effects of the present invention, the thicknesses of the electrode layers (the positive electrode active material layer and the negative electrode active material layer) are preferably set to 1 μm or more, more preferably set to 3 μm or more, still more preferably set to 5 μm or more, and particularly preferably set to 10 μm or more. The upper limit is preferably 2,000 μm or less, more preferably 1,000 μm or less, and particularly preferably 500 μm or less. Meanwhile, the solid electrolyte layer is desirably thin while preventing short-circuiting between positive and negative electrodes. Specifically, the thickness thereof is preferably set to 1 μm or more, more preferably set to 3 μm or more, still more preferably set to 5 μm or more, and particularly preferably set to 10 μm or more. The upper limit is preferably 500 μm or less, more preferably 300 μm or less, and particularly preferably 100 μm or less.

Meanwhile, functional layers, member, or the like may be appropriately interposed or disposed between or outside the respective layers of the negative electrode collector 1, the negative electrode active material layer 2, the solid electrolyte layer 3, the positive electrode active material layer 4, and the positive electrode collector 5. In addition, the respective layers may be constituted of a single layer or multiple layers.

<Gradient Structure>

In the all solid state secondary battery of the present invention, the electrode layer includes an inorganic solid electrolyte, an active material, and a polymer having a specific functional group (hereinafter, in some cases, referred to as the specific polymer). In the present invention, the electrode layers (the positive electrode active material layer and the negative electrode active material layer) are preferably set so that the volume ratio $V_E/V_{SE}$ ($V_r$) of the total volume $V_E$ of the active material to the total volume $V_{SE}$ of the inorganic solid electrolyte changes and more preferably set so that the volume ratio increases from the inorganic solid electrolyte layer side toward the collector side. That is, in the present embodiment, the inorganic solid electrolyte and the active materials have an inclined structure (gradient structure) in the electrode layers. Therefore, compared with inorganic solid electrolytes and active materials not having a gradient structure, ion conductivity is not hindered, and it becomes possible to suppress battery resistance at a low level, which is preferable. At this time, it is considered that the use of the specific polymer (binder) increases bonding properties with respect to the active materials and the solid electrolyte. In addition, the specific polymer is suitable for a precipitation method with which the inclined structure (gradient structure) can be preferably formed, and the manufacturing suitability is also excellent.

Figure 2:
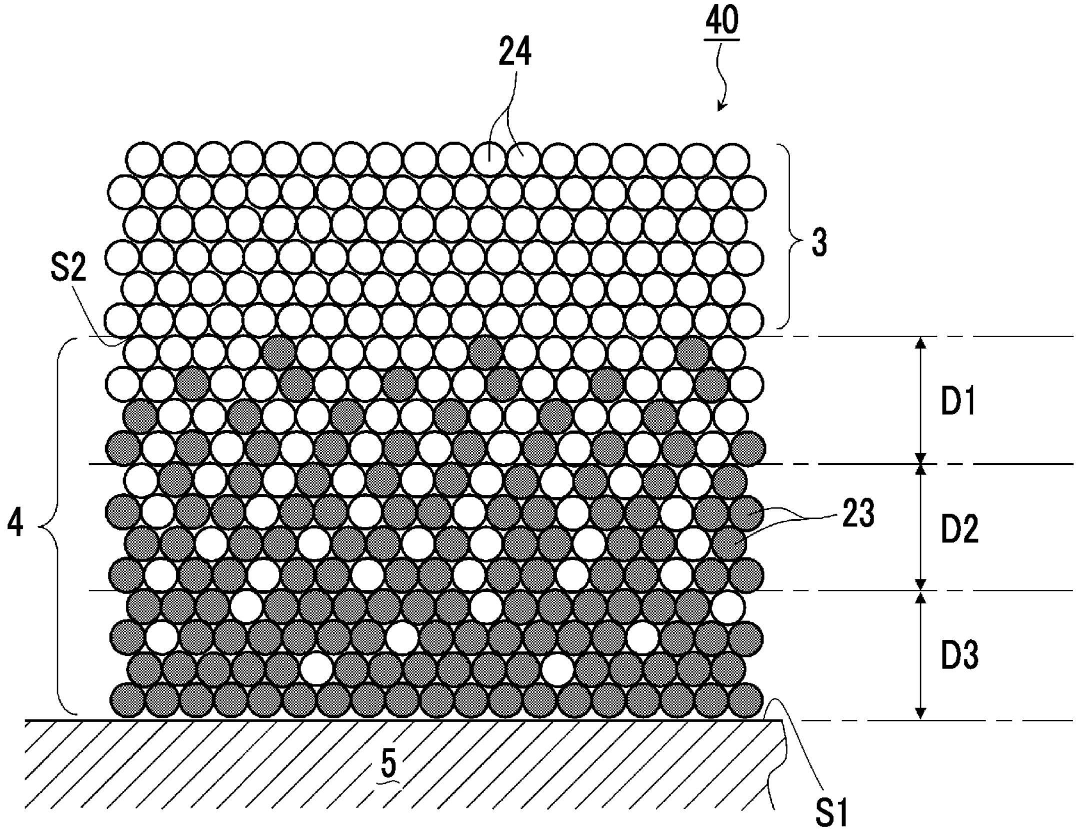
FIG. 2 is a cross-sectional view schematically illustrating an electrode sheet for a positive electrode according to the preferred embodiment of the present invention.

This embodiment can be depicted as illustrated in FIG. 2 (however, the present invention is not interpreted to be limited by this drawing and description based thereon). The drawing illustrated an electrode sheet for a positive electrode 40. Black circles in the drawing indicate active material particles 23, and white circles indicate inorganic solid electrolyte particles 24. When the positive electrode is divided into an upper layer D1, an intermediate layer D2, and a lower layer D3 from the collector 5 toward the inorganic solid electrolyte layer 3, it is found that the proportions of the black circles and the white circles present therein change in the respective layers. That is, in the respective layer, the proportions of the inorganic solid electrolyte particles and the active material particles change. Specifically, in the lower layer D3 close to the collector, a number of the active material particles are present. In the upper layer D1, a number of the inorganic solid electrolyte particles are disposed. In the intermediate layer D2 therebetween, both of the active material particles and the inorganic solid electrolyte particles are disposed in proportions therebetween.

The above-described inclined structure can be expressed by the total volume $V_E$ of the active material and the total volume $V_{SE}$ of the inorganic solid electrolyte. Specifically, when the volume of one active material particle is represented by $V_{E1}$, the total volume of the active material becomes $\Sigma V_{E1}$, which is expressed as $V_E$. When the volume of one inorganic solid electrolyte particle is represented by $_{VSE1}$, the total volume of the inorganic solid electrolyte becomes $\Sigma V_{SE1}$, which is expressed as $V_{SE}$. In the present invention, $V_E/V_{SE}$ is set to increase toward the collector, that is, the proportion of the active material is set to increase toward the collector as described above. Here, $Vr=V_E/V_{SE}$. This Vr will be referred to as the gradient ratio. In addition, the electrode layer is divided into three parts, and the parts are designated as a D1 layer, a D2 layer, and a D3 layer respectively from the inorganic solid electrolyte layer. Vr of the D1 layer is defined as $Vr_{D1}$, Vr of the D2 layer is defined as $Vr_{D2}$, and Vr of the D3 layer is defined as $Vr_{D3}$. When the gradient structure in the present invention is represented by $Vr_{D3}/Vr_{D1}$, in the present invention, the gradient structure is preferably 1.2 or more, more preferably 1.5 or more, still more preferably 1.7 or more, and particularly preferably 2 or more. There is no particular upper limit, but the upper limit is realistically 20 or less. The boundaries between the inorganic solid electrolyte layer and the electrode layers may be arbitrarily set; however, basically, a portion in which the proportion of the inorganic solid electrolyte exceeds 95%, in other words, a portion prior to a portion in which Vr ($V_E/V_{SE}$) is below 0.05 is defined as the inorganic solid electrolyte layer.

In the electrode layers of the present invention, the changes in the proportions of the active materials and the inorganic solid electrolyte are preferably continuous. In other words, it is preferable that there are no interfaces in which the proportions significantly change accordingly at a certain place. The above-described continuity of the changes in the proportions of the active materials and the inorganic solid electrolyte can be evaluated using a change ratio dVr (dVr/dt) of the gradient ratio per unit thickness (t). dVr represents the amount of a change of Vr per a thickness of 0.1 μm. In the present invention, from a collector surface S1 through a solid electrolyte layer surface S2, dVr in the thickness direction is preferably 0.5 or less, more preferably 0.3 or less, and particularly preferably 0.1 or less in all places. There is not particularly lower limit, but the lower limit is realistically 0.00001 or more. Meanwhile, in a joining method described below, generally, dVr reaches 0.6 or more.

Methods for forming the above-described structure in which the inorganic solid electrolyte particles and the active material particles are disposed in an inclined manner (gradient structure) are not particularly limited, and, for example, the following two methods are considered.

(1) Precipitation Method

A dispersion element is formed by adding active material particles and inorganic solid electrolyte particles to a dispersion medium, and the active material particles and the inorganic solid electrolyte particles are eccentrically located in the vertical direction through the action of gravity. That is, the difference between the precipitation rate $R_e$ of the active material particles and the precipitation rate $R_{se}$ of the inorganic solid electrolyte particles is used in this method. In this method, it is preferable that active materials, inorganic solid electrolytes, dispersion media, other additives (for example, a binder), and the like are appropriately selected and dispersion elements in which $R_e > R_{se}$ is satisfied are constituted. When the dispersion element is applied onto a collector, it is possible to effectively form the above-described gradient structure after the dispersion element is left to stand.

(2) Joining Method

Among dispersion elements of inorganic solid electrolyte particles and active material particles, a dispersion element in which the proportion of active material particles is increased is prepared. This dispersion element is applied onto a collector. After the dispersion element is dried, furthermore, a dispersion element in which the proportion of the inorganic solid electrolyte particles is further increased is applied and dried thereon. On the other hand, a dispersion element in which the proportion of inorganic solid electrolyte particles is set to be relatively high is applied to an inorganic solid electrolyte layer, and a dried film of the dispersion element is formed. A laminate complex on the collector side and a laminate complex on the inorganic solid electrolyte layer side are operated repeatedly as many as necessary. The collector and the inorganic solid electrolyte layer produced in the above-described manner are joined so as to be present outwards on both sides, whereby a desired gradient structure can be obtained.

In the present invention, among these, Method (1) is preferred. When the method in which the difference in precipitation rate is used as described above is applied, it is possible to more preferably realize structures in which the gradients (dVr) of the concentrations of inorganic solid electrolytes and active materials continuously change, which is preferable. In contrast, in methods such as Method (2), the number of joined interfaces increases, and there is a concern of an increase in resistance. In addition, the difference (dVr) in concentration gradient in interfaces increases, and the interfaces may have an influence on ion conductivity. In Method (1), the above-described interfaces are not easily generated, and it is possible to realize favorable inclined structures (gradient structures) having a continuous concentration gradient as illustrated in FIG. 2, which is preferable.

Specific examples of methods for controlling $R_e$ and $R_{se}$ include (1) a method in which active material particles are connected to each other using additives, aggregates of the active material particles are formed, and the precipitation rate of active materials is increased and (2) a method in which the solid content concentrations of dispersions of inorganic solid electrolytes and active materials are decreased, thereby decreasing the repulsive forces between particles and increasing the precipitation rates of highly viscous active materials. Among these, Method (1) is preferred. Since it is possible to control precipitation rates without decreasing solid content concentrations, Method (1) is superior in terms of the thickness reduction and density increase of electrodes.

In consideration of the above-described advantages in terms of manufacturing methods, the concentration of the solid components (solid content concentration) in the solid electrolyte composition of the present invention is preferably adjusted. The solid components are typically constituted of solid electrolytes and electrode active materials. The concentration of the solid components with respect to the total amount of the solid electrolyte composition is preferably 1% by mass or more, more preferably 3% by mass or more, still more preferably 5% by mass or more, and particularly preferably 10% by mass or more. The upper limit is preferably 90% by mass or less, more preferably 80% by mass or less, still more preferably 70% by mass or less, and particularly preferably 60% by mass or less. The proportions of the solid electrolyte and the active materials are preferably appropriately adjusted, and the proportions of the active materials in the solid electrolyte composition are preferably set to 50 parts by mass or more, more preferably set to 100 parts by mass or more, and particularly preferably set to 200 parts by mass or more with respect to 100 parts by mass of the solid electrolyte. The upper limit is preferably set to 2,000 parts by mass or less, more preferably set to 1,000 parts by mass or less, and particularly preferably set to 500 parts by mass or less.

In the precipitation method, the difference in specific weight between the solid electrolyte and the active materials is preferably great. The ratio ($D_e/D_{se}$) of the specific weight $D_e$ of the active material to the specific weight $D_{se}$ of the solid electrolyte is preferably 1.1 or more, more preferably 1.3 or more, still more preferably 1.5 or more, and particularly preferably 1.7 or more. The upper limit is preferably 5 or less, more preferably 4 or less, still more preferably 3 or less, and particularly preferably 2.5 or less.

<Solid Electrolyte Composition>

(Inorganic Solid Electrolyte)

The inorganic solid electrolyte refers to an inorganic solid electrolyte, and the solid electrolyte refers to a solid-form electrolyte capable of migrating ions therein. From this viewpoint, there are cases in which the inorganic solid electrolyte will be referred to as the ion-conductive inorganic solid electrolyte in consideration of distinction from electrolyte salts described below (supporting electrolytes).

The inorganic solid electrolyte does not include organic substances as primary ion-conductive materials and is thus clearly differentiated from organic solid electrolytes (high-molecular electrolytes represented by PEO or the like and organic electrolyte salts represented by LITFSI or the like). In addition, the inorganic solid electrolyte is solid in a steady state and is thus, generally, not dissociated or liberated into cations and anions. Therefore, the inorganic solid electrolyte is also clearly differentiated from inorganic electrolyte salts that are disassociated or liberated into cations and anions in electrolytic solutions or polymers ($LiPF_6$, $LiBF_4$, LiFSI, LiCl, and the like). The inorganic solid electrolyte is not particularly limited as long as the inorganic solid electrolyte has a conductivity of ions of metals belonging to Group I or II of the periodic table and generally does not have an electron conductivity.

In the present invention, the inorganic solid electrolyte has a conductivity of ions of metals belonging to Group I or II of the periodic table. As the inorganic solid electrolyte, it is possible to appropriately select and use solid electrolyte materials being applied to this kind of products. Typical examples of the inorganic solid electrolyte include (i) sulfide-based inorganic solid electrolytes and (ii) oxide-based inorganic solid electrolytes.

(i) Sulfide-Based Inorganic Solid Electrolytes

Sulfide-based inorganic solid electrolytes are preferably inorganic solid electrolytes which contain sulfur (S), have an ion conductivity of metals belonging to Group I or II of the periodic table, and has electron-insulating properties. Examples thereof include lithium ion-conductive inorganic solid electrolytes satisfying a compositional formula represented by General Formula (1) below.

$$Li_{a1}M_{b1}P_{c1}S_{d1}A_{e1} \quad \text{General Formula (1)}$$

(In the formula, L represents an element selected from Li, Na, and K and is preferably Li. M represents an element selected from B, Zn, Sn, Si, Cu, Ga, Sb, Al, and Ge. Among these, B, Sn, Si, Al, and Ge are preferred, and Sn, Al, and Ge are more preferred. A represents I, Br, Cl, or F and is preferably I or Br and particularly preferably I. al to el represent the compositional ratios among the respective elements, and a1:b1:c1:d1:e1 satisfies 1 to 12:0 to 1:1:2 to 12:0 to 5. al is, furthermore, preferably 1 to 9 and more preferably 1.5 to 4. b 1 is preferably 0 to 0.5. dl is, furthermore, preferably 3 to 7 and more preferably 3.25 to 4.5. el is, furthermore, preferably 0 to 3 and more preferably 0 to 1.)

Regarding the compositional ratios among L, M, P, S, and A in General Formula (1), it is preferable that bl and el are zero, it is more preferable that bl is zero, el is zero, and the fractions (a1:c1:d1) of al, cl, and dl is al:cl:d1=1 to 9:1:3 to 7, and it is still more preferable that b1 is zero, e1 is zero, and a1:c1:d1 is 1.5 to 4:1:3.25 to 4.5. The compositional ratios among the respective elements can be controlled by adjusting the amounts of raw material compounds blended during the manufacturing of the sulfide-based solid electrolyte.

The sulfide-based solid electrolyte may be non-crystalline (glass) or crystallized (made into glass ceramic) or may be only partially crystallized.

The ratio between $Li_2S$ and $P_2S_5$ in Li—P—S-based glass and Li—P—S-based glass ceramic is preferably 65:35 to 85:15 and more preferably 68:32 to 75:25 in terms of the molar ratio between $Li_2S$:$P_2S_5$. When the ratio between $Li_2S$ and $P_2S_5$ is set in the above-described range, it is possible to increase the lithium ion conductivity. Specifically, the lithium ion conductivity can be preferably set to $1\times10^{-4}$ S/cm or more and more preferably set to $1\times10^{-3}$ S/cm or more. There is no particular upper limit, but $1\times10^{-1}$ S/cm or less is realistic.

Specific examples of the compound include compounds formed using a raw material composition containing, for example, $Li_2S$ and a sulfide of an element of Groups XIII to XV. Specific examples thereof include $Li_2S$—$P_2S_5$, $Li_2S$—LiI—$P_2S_5$, $Li_{32}S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$Li_4SiO_4$, $Li_{10}GeP_2S_{12}$ and the like. Among these, crystalline and/or amorphous raw material compositions made of $Li_2S$—$P_2S_5$, $Li_2S$—$GeS_2$—$Ga_2S_3$, $Li_2S$—LiI—$P_2S_5$, $Li_2S$—LiI-$Li_2O$—$P_2S_5$, $Li_2S$—$SiS_2$—$Li_3PO_4$, $Li_2S$—$GeS_2$—$P_2S_5$, or $Li_{10}GeP_2S_{12}$ are preferred due to their high lithium ion conductivity. Examples of a method for synthesizing sulfide solid electrolyte materials using the above-described raw material compositions include an amorphorization method. Examples of the amorphorization method include a mechanical milling method and a melting quenching method, and, among these, the mechanical milling method is preferred. This is because treatments at normal temperature become possible and it is possible to simplify manufacturing steps.

The sulfide solid electrolyte is more preferably a solid electrolyte represented by General Formula (2) below.

$$Li_{1a}P_{ma}S_{na} \quad \text{General Formula (2)}$$

In the formula, 1a to na represent the compositional ratios among individual elements, and la:ma:na satisfies 2 to 4:1:3 to 10.

(ii) Oxide-Based Inorganic Solid Electrolytes

Oxide-based solid electrolytes are preferably solid electrolytes which contain oxygen (O), have an ion conductivity of metals belonging to Group I or II of the periodic table, and have electron-insulating properties.

Specific examples of the compound include $Li_{xa}La_{ya}TiO_3$ [xa=0.3 to 0.7 and ya=0.3 to 0.7] (hereinafter, also simply referred to as "LLT"), $Li_{xb}La_{yb}Zr_{zb}M^{bb}_{mb}O_{nb}$ ($M^{bb}$ is at least one element of Al, Mg, Ca, Sr, V, Nb, Ta, Ti, Ge, In, or Sn, xb satisfies 5≤xb≤10, yb satisfies 1≤yb satisfies 1≤z≤4, mb satisfies 0≤mb≤2, and nb satisfies 5≤nb≤20), $Li_{xe}B_{yc}M^{cc}_{zc}O_{ne}$ ($M^{cc}$ is at least one element of C, S, Al, Si, Ga, Ge, In, or Sn, xc satisfies 0≤xc≤5, yc satisfies 0≤yc≤1, zc satisfies 0≤zc≤1, and nc satisfies 0≤nc≤6.), $Li_{xd}$(Al, $Ga)_{yd}$(Ti, $Ge)_{zd}Si_{ad}P_{md}O_{nd}$ (here, 1≤x≤3, 0≤yd≤1, 0≤zd≤2, 0≤ad≤1, 1≤md≤7, and 3≤nd≤13.), $Li_{(3-2xe)}M^{ee}_{xe}D^{ee}O_{ne}$ (xe represents a numerical value of 0 or more and 0.1 or less, and $M^{ee}$ represents a divalent metal element. $D^{ee}$ represents a halogen atom or a combination of two or more halogen atoms.), $Li_{xf}Si_{yf}O_{zf}$ (1≤x≤5, 0<yf≤3, and 1≤zf<10), $Li_{xg}S_{yg}O_{Lg}$ (1≤xg≤3, 0<yg≤2, and 1≤zg≤10), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w satisfies w <1), $Li_{3.5}Zn_{0.25}GeO_4$ having a lithium super ionic conductor (LISICON)-type crystal structure, $La_{0.55}Li_{0.35}TiO_3$ having a perovskite-type crystal structure, $LiTi_2P_3O_{12}$ having a natrium super ionic conductor (NASICON)-type crystal structure, $Li_{1+xh+yh}$(Al, $Ga)_{xh}$(Ti, $Ge)_{2-xh}Si_{yh}P_{3-yh}O_{12}$ (here, 0≤xh≤1 and 0≤yh≤1), $Li_7La_3Zr_2O_{12}$ having a garnet-type crystal structure, and the like. In addition, phosphorus compounds including Li, P, and O are also preferred. Examples thereof include lithium phosphate ($LI_3PO_4$), LiPON in which part of oxygen atoms in lithium phosphate are substituted with nitrogen atoms, and $LiPOD^1$ ($D^1$ represents at least one element selected from Ti, V, Cr, Mn, Fe, Co, Ni, Cu, Zr, Nb, Mo, Ru, Ag, Ta, W, Pt, Au, or the like). In addition, $LiA^1ON$ ($A^1$ is at least one element selected from Si, B, Ge, Al, C, Ga, or the like) and the like can also be preferably used.

Among these, $Li_{xa}La_{ya}TiO_3$ [xa=0.3 to 0.7 and ya=0.3 to 0.7] (LLT), $Li_{xb}La_{yb}Zr_{zb}M^{bb}_{mb}O_{nb}$ ($M^{bb}$ is at least one element of Al, Mg, Ca, Sr, V, Nb, Ta, Ti, Ge, In, or Sn, xb satisfies 5≤xb≤10, yb satisfies 1≤y≤4, zb satisfies 1≤z≤4, mb satisfies 0≤mb≤2, and nb satisfies 5≤nb≤20.), $Li_7La_3Zr_2O_{12}$ (hereinafter, also simply referred to as "LLZ"), $Li_3BO_3$, $Li_3BO_3$—$Li_2SO_4$, and $Li_{xd}$(Al, $Ga)_{yd}$(Ti, $Ge)_{zd}Si_{ad}P_{md}O_{nd}$ (here, 1≤xd≤3, 0≤yd≤1, 0≤zd≤2, 0≤ad≤1, 1≤md≤7, and 3≤nd≤13.) are preferred. These oxide-based inorganic solid electrolytes may be used singly or two or more oxide-based solid electrolytes may be used in combination.

The ion conductivity of the lithium ion-conductive oxide-based inorganic solid electrolyte is preferably $1\times10^{-6}$ S/cm or more, more preferably $5\times10^{-6}$ S/cm or more, and particularly preferably $1\times10^{-5}$ S/cm or more.

In the present invention, among these, the sulfide-based inorganic solid electrolytes are preferably used. The sulfide-based inorganic solid electrolytes generally have a smaller specific weight than the active materials. Therefore, the gradient structure formation effect of the above-described precipitation method becomes more significant, which is preferable.

The average particle diameter of the inorganic solid electrolyte is not particularly limited, but is preferably 0.01 μm or more and more preferably 0.1 μm or more. The upper limit is preferably 100 μm or less and more preferably 50 μm or less. Meanwhile, the average particle diameter of the inorganic solid electrolyte is measured in the following order.

A dispersion liquid (1% by mass) of inorganic particles is diluted and adjusted using water (in the case of a substance unstable in water, heptane) in a 20 ml sample bottle. The diluted dispersion specimen is irradiated with 1 kHz ultrasonic waves for ten minutes and immediately used for tests. Data acquisition is carried out 50 times using this dispersion liquid specimen, a laser diffraction/scattering particle size analyzer LA-920 (manufactured by Horiba Ltd.), and a silica cell for measurement at a temperature of 25° C., and the obtained volume-average particle diameter is used as the average particle diameter. Regarding other detailed conditions and the like, the description of JIS Z8828:2013 "Particle diameter analysis-dynamic light scattering method" is referred to as necessary. Five specimens are produced each level, and the average value thereof is employed.

When the satisfaction of both of the battery performance and an effect of reducing and maintaining the interface resistance is taken into account, the concentration of the inorganic solid electrolyte in the solid electrolyte composition in terms of the solid component is preferably 5% by mass or more, more preferably 10% by mass or more, and still more preferably 20% by mass or more with respect to 100% by mass of the solid component. From the same viewpoint, the upper limit is preferably 99.9% by mass or less, more preferably 99.5% by mass or less, and still more preferably 99% by mass or less.

Meanwhile, in the present specification, the solid component refers to a component that does not volatilize or evaporate and thus disappear when dried at 170° C. for six hours, and typically, refers to a component other than dispersion media described below.

The inorganic solid electrolyte may be used singly or two or more inorganic solid electrolytes may also be used in combination.

(Specific Polymer)

The specific polymer constituting a binder being used in the preferred embodiment of the present invention has a specific functional group. Into this polymer, a repeating unit derived from a macromonomer (X) having a weight-average molecular weight of 1,000 or more is preferably combined as a side chain component. In addition, the specific polymer is preferably an acrylic resin or urethane resin.

Main Chain Component

The main chain of the polymer in the present embodiment is not particularly limited and can be constituted of an ordinary polymer component. Monomers constituting the main chain component are preferably monomers having a polymerizable unsaturated bond, and, for example, vinyl-based monomers or acrylic monomers can be applied. In the present invention, among these, it is preferable to use acrylic monomers as the main chain component. More preferably, monomers selected from (meth)acrylic acid monomers, (meth)acrylic acid ester monomers, (meth)acrylic acid amide monomers, and (meth)acrylonitrile are preferably used as the main chain component. The number of polymerizable groups is not particularly limited, but is preferably 1 to 4.

The polymer in the present embodiment has at least one specific functional group selected from acidic functional groups (for example, the following group of functional groups (a)), amide groups ($CONR^N$), or hydroxyl groups and preferably has an acidic functional group. The specific functional group may be included in the main chain or in a side chain described below. It is considered that, when the specific functional group is included, particularly, in the precipitation method, favorable characteristics are exhibited, and desired gradient structures are formed. Meanwhile, the acidic functional group may form a salt. In addition, in the case of a divalent acid (a phosphoric acid group, a succinic acid group, or the like), the acidic functional group may also become a monoester.

Group of Functional Groups (a)

A carboxyl group, a phosphoric acid group, a phosphoric acid group, and a sulfonic acid group The vinyl-based monomer forming the polymer is preferably a monomer represented by General Formula (a-1) or (a-2) below. Among these, as described above, a specific functional group (acidic functional group or the like)-containing monomer is preferably used at least partially as the polymer according to the present invention.

(a-1)

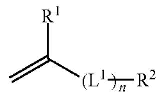

(a-2)

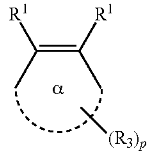

In the formulae, $R^1$ represents a hydrogen atom, a hydroxyl group, a cyano group, a halogen atom, a carboxyl group, an alkyl group (the number of carbon atoms is preferably 1 to 24, more preferably 1 to 12, and particularly preferably 1 to 6), an alkenyl group (the number of carbon atoms is preferably 2 to 24 carbon atoms, more preferably 2 to 12, and particularly preferably 2 to 6), an alkynyl group (the number of carbon atoms is preferably 2 to 24 carbon atoms, more preferably 2 to 12, and particularly preferably 2 to 6), or an aryl group (the number of carbon atoms is preferably 6 to 22 and more preferably 6 to 14). Among these, a hydrogen atom or an alkyl group is preferred, and a hydrogen atom or a methyl group is more preferred.

Examples of $R^2$ include a hydrogen atom and a substituent T. Among these, a hydrogen atom, an alkyl group (the number of carbon atoms is preferably 1 to 24, more preferably 1 to 12, and particularly preferably 1 to 6), an alkenyl group (the number of carbon atoms is preferably 2 to 12 and more preferably 2 to 6), an aryl group (the number of carbon atoms is preferably 6 to 22 and more preferably 6 to 14), an aralkyl group (the number of carbon atoms is preferably 7 to 23 and more preferably 7 to 15), an alkoxy group (the number of carbon atoms is preferably 1 to 12, more preferably 1 to 6, and particularly preferably 1 to 3), an aryloxy group (the number of carbon atoms is preferably 6 to 22, more preferably 6 to 14, and particularly preferably 6 to 10), an aralkyloxy group (the number of carbon atoms is preferably 7 to 23, more preferably 7 to 15, and particularly preferably 7 to 11), a cyano group, a carboxyl group, a hydroxyl group, a thiol group (sulfanyl group), a sulfonic acid group, a phosphoric acid group, a phosphonic acid group, an aliphatic heterocyclic group containing an oxygen atom (the number of ring members is preferably 2 to 12, and more preferably 2 to 6), a (meth)acryloyl group, and an amino group ($NR^N_2$: $R^N$ is preferably a hydrogen atom or an alkyl group having 1 to 3 carbon atoms according to the definition described below) are preferred. Among these, a methyl group, an ethyl group, a propyl group, a butyl group, a cyano group, an ethenyl group, a phenyl group, a hydroxyl group, an amino group, a carboxyl group, a thiol group, a sulfonic acid group, and the like are preferred.

When $R^2$ is a group capable of having a substituent (for example, an alkyl group, an alkenyl group, an aryl group, or the like), $R^2$ may further have the substituent T described below. Among these, $R^2$ may have a carboxyl group, a halogen atom (a fluorine atom or the like), a hydroxyl group, a (meth)acryloyl group, a (meth)acryloyloxy group, a (meth) acryloyloxyalkyl group, an alkyl group, an alkenyl group (a vinyl group or an allyl group), or the like as a substituent. When the alkyl group is a group having a substituent, examples thereof include halogenated (fluorinated) alkyl groups and (meth)acryloyloxyalkyl group. When the aryl group is an aryl group, examples thereof include a carboxyaryl group such as a benzoic acid group, a hydroxyaryl group such as a phenol group, and halogenated (brominated) aryl groups.

When $R^2$ is an acidic group such as a carboxyl group, a sulfonic acid group, a phosphoric acid group, or a phosphonic group, $R^2$ may be a salt or ester of the acidic group. Examples of esterified portions include groups in which an alkyl group having 1 to 6 carbon atoms or an alkyl group having 1 to 6 carbon atoms is substituted with a (meth) acryloyloxy group.

The aliphatic heterocyclic group containing an oxygen atom is preferably an epoxy group-containing group, an oxetane group-containing group, a tetrahydrofuryl group-containing group, or the like.

$L^1$ is an arbitrary linking group, and examples thereof include linking groups L described below. Among these, specific examples thereof include an alkylene group (the number of carbon atoms is preferably 1 to 24, more preferably 1 to 12, and particularly 1 to 6), an alkenylene group (the number of carbon atoms is preferably 2 to 22, more preferably 2 to 14, and particularly preferably 2 to 10), an arylene group (the number of carbon atoms is preferably 6 to 22, more preferably 6 to 14, and particularly preferably 6 to 10), an oxygen atom, a sulfur atom, an imino group ($NR^N$), a carbonyl group, a phosphoric acid linking group (—O—P(OH)(O)—O—), a phosphonic acid linking group (—P(OH)(O)—O—), a (poly)alkyleneoxy group, a (poly) ester group, a (poly)amide group, groups according to combinations thereof, and the like. The linking group may have an arbitrary substituent. Preferred ranges of the number of linking atoms and the number of atoms constituting the linking group are also the same as described below. Examples of the arbitrary substituent include the substituent T, and examples thereof include an alkyl group, a halogen atom, and the like. The number of combinations of the linking groups (when CO and O are combined to each other, the number of combinations is two) is preferably 1 to 16, more preferably 1 to 8, still more preferably 1 to 6, and particularly preferably 1 to 3.

When $L^1$ is bonded to the double bond in the formula through —CO—O—, it is preferable that the residual portion prior to $L^1$ becomes a single bond or is an alkylene group having 1 to 6 carbon atoms (preferably 1 to 3), an oxygen atom, a (poly)alkyleneoxy group, a (poly)ester group, or a group according to a combination thereof. The preferred range of the number of combinations of the linking group is the same as above.

When $L^1$ is bonded to the double bond in the formula through —O— or has neither CO nor O, it is preferable that the residual portion prior to $L^1$ becomes a single bond.

It is preferable that, among these, $L^1$ includes a —CO—O— linkage, that is, the binder is constituted of an acrylic high-molecular-weight compound. The copolymerization proportion of an acrylic monomer in the high-molecular-weight compound is preferably 0.1 to 1, more preferably 0.3 to 1, still more preferably 0.5 to 1, and particularly preferably 0.8 to 1 in terms of molar fractions.

n represents 0 or 1.

α represents a non-aromatic cyclic structural portion and is preferably a four- to seven-membered ring and more preferably a five- or six-membered ring. a may be a non-aromatic hydrocarbon ring or non-aromatic hetero ring. When a is a non-aromatic hetero ring, examples of a hetero atom or a group thereof include an oxygen atom, a sulfur atom, a carbonyl group, an imino group ($NR^N$), and a nitrogen atom (=N—).

Examples of $R^3$ include the substituent T described below. This $R^3$ may be bonded to the ring structure a with a double bond. Examples thereof include substitution as a carbonyl structure (>C=O) or an imino structure (>C=$NR^N$) in which a carbon atom is accompanied in the ring. When there are a plurality of $R^3$'s, $R^3$'s may be linked to each other and form a ring structure.

Examples of the ring structure a include a cyclohexene ring, a norbornene ring, and a maleimide ring.

p is an integer of 0 or more and the number of elements that can be substituted or less.

A monomer forming the polymer is preferably a monomer represented by any one of General Formula (b-1) to (b-10) below. Among these, as described above, a specific functional group (acidic functional group or the like)-containing monomer is preferably used at least partially as the polymer according to the present invention.

(b-1)

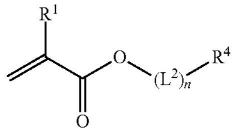

(b-2)

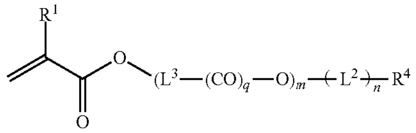

(b-3)

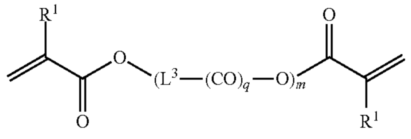

-continued (b-4)

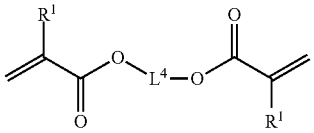

(b-5)

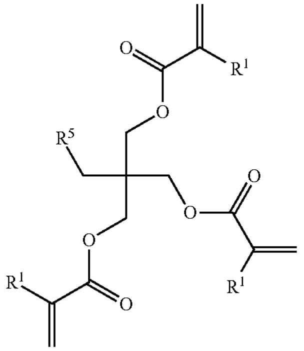

(b-6)

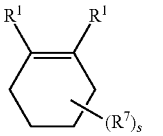

(b-7)

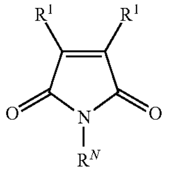

(b-8)

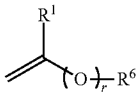

(b-9)

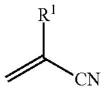

(b-10)

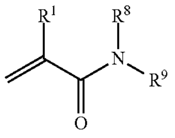

$R^1$ and n are the same as in General Formula (a-1).

$R^4$ is the same as $R^2$. However, examples of preferred $R^4$ include a hydrogen atom, an alkyl group which may have a halogen atom (a fluorine atom), an aryl group which may have a carboxyl group or a halogen atom, a carboxyl group, a thiol group, a phosphoric acid group, a phosphonic acid group, a sulfonic acid group, an aliphatic heterocyclic group containing an oxygen atom, an amino group ($NR^N{}_2$), and the like.

$L^2$ is an arbitrary linking group, preferably the example of $L^1$, and more preferably an oxygen atom, an alkylene group (the number of carbon atoms is preferably 1 to 24, more preferably 1 to 12, and particularly preferably 1 to 6), an alkenylene group (the number of carbon atoms is preferably 1 to 24 and more preferably 1 to 12), a carbonyl group, an imino group ($NR^N$), a (poly)alkyleneoxy group, a (poly) ester group, a group according to a combination thereof, or the like. The number of combinations of the linking group is preferably 1 to 16, more preferably 1 to 8, still more preferably 1 to 6, and particularly preferably 1 to 3.

$L^3$ is a linking group, preferably the examples of $L^2$, and more preferably an alkylene group having 1 to 6 carbon atoms (preferably 1 to 3 carbon atoms).

$L^4$ is the same as $L^1$, and, among these, an alkylene group, a phosphoric acid linking group, a (poly)alkyleneoxy group, a (poly)ester group, or a combination thereof is preferred. The number of combinations of the linking group is preferably 1 to 16, more preferably 1 to 8, still more preferably 1 to 6, and particularly preferably 1 to 3.

$R^5$ is a hydrogen atom, an alkyl group having 1 to 6 carbon atoms (preferably 1 to 3 carbon atoms), a hydroxyl group-containing group having 0 to 6 carbon atoms (preferably 0 to 3 carbon atoms), a carboxyl group-containing group having 0 to 6 carbon atoms (preferably 0 to 3 carbon atoms), or a (meth)acryloyloxy group-containing group. Meanwhile, $R^5$ may become the linking group of $L^1$ (for example, an oxygen atom) and constitute a dimer in this portion.

q is 0 or 1.

m represents an integer of 1 to 200, preferably an integer of 1 to 100, and more preferably an integer of 1 to 50.

$R^6$ is any one of a sulfonic acid group, an aryl group, an alkenyl group, a cyano group, an alkyl group, a carboxyl group, and a carboxylalkyl group (the number of carbon atoms is preferably 2 to 13, more preferably 2 to 7, and particularly preferably 2 to 4) which may have a hydroxyl group or an alkenyl group. When the specific polymer is a polymer having a hydroxyl group, r is 0 or 1. When r is 1, among these, $R^6$ is preferably an alkyl group or an aryl group.

$R^7$ is the same as $R^3$. Among these, a hydrogen atom, an alkyl group, and an aryl group are preferred.

s is an integer of 0 to 8. When there are two or more $R^7$'s, $R^7$'s may be linked to each other and form a ring structure.

Examples of $R^8$ include a hydrogen atom or the substituent T. Among these, a hydrogen atom, alkyl group (the number of carbon atoms is preferably 1 to 24, more preferably 1 to 12, and particularly preferably 1 to 6), an alkenyl group (the number of carbon atoms is preferably 2 to 12 and more preferably 2 to 6), an aryl group (the number of carbon atoms is preferably 6 to 22 and more preferably 6 to 14), or an aralkyl group (the number of carbon atoms is preferably 7 to 23 and more preferably 7 to 15). Among these, a hydrogen atom, a methyl group, an ethyl group, a propyl group, a butyl group, or a phenyl group are particularly preferred.

$R^9$ is the same as $R^8$. $R^9$ and $R^9$ may further have a substituent and, for example, may have the specific functional group.

In General Formulae (b-1) to (b-10), groups which may have a substituent such as an alkyl group, an aryl group, an alkylene group, or an arylene group may have an arbitrary substituent as long as the effects of the present invention can be maintained. Examples of the arbitrary substituent include the substituent T, and, specifically, the groups may have an arbitrary substituent such as a halogen atom, a hydroxyl group, a carboxyl group, a thiol group, an acyl group, an acyloxy group, an alkoxy group, an aryloxy group, an aryloyl group, an aryloyloxy group, or an amino group.

The specific polymer has the specific functional group (an acidic functional group, a hydroxyl group, or an amide group), which preferably satisfies any monomer conditions of (i) to (iii) below.

(i) Acidic functional group-containing monomers n is 0 in General Formula (b-1), and $R^4$ is a hydrogen atom.

$R^4$ is a group having a carboxyl group, a phosphoric acid group, a phosphonic acid group, or a sulfonic acid group in General Formula (b-1).

q is 1 and n is 0 in General Formula (b-2), and $R^4$ is a hydrogen atom.

$R^4$ is a group having a carboxyl group, a phosphoric acid group, a phosphonic acid group, or a sulfonic acid group in General Formula (b-2).

$R^6$ is a group having a carboxyl group, a phosphoric acid group, a phosphonic acid group, or a sulfonic acid group in General Formula (b-8).

Specific examples thereof include monomers represented by a101 to 108 below.

(ii) Hydroxyl group-containing monomers

In General Formulae (b-1), (b-2), and (b-8), $R^4$ or $R^6$ is an alkyl group having a hydroxyl group (the number of carbon atoms is preferably 1 to 24, more preferably 1 to 12, and particularly preferably 1 to 6).

Specific examples thereof include A-10, A-13, and the like described below.

(iii) Amide group-containing monomers

These monomers are represented by General Formulae (b-7) and (b-10). Specific examples thereof include A-22, A-23, A-24, A-25, A-57, A-58, and the like.

Hereinafter, examples of a monomer forming the main chain of the specific polymer will be described, but the present invention is not interpreted to be limited thereto. Compounds having a name beginning with 'A' are examples in which an acidic functional group is not provided, and compounds having a name beginning with 'a' are examples in which an acidic functional group is provided. In the following formulae, n is different from above, represents 1 to 1,000,000, and is preferably 1 to 10,000 and more preferably 1 to 500.

A-1

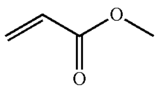

A-2

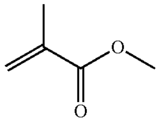

A-3

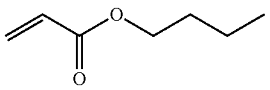

A-4

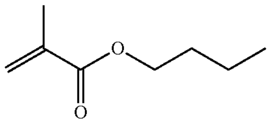

A-5

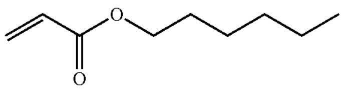

A-6

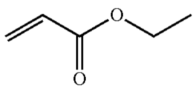

-continued

A-7

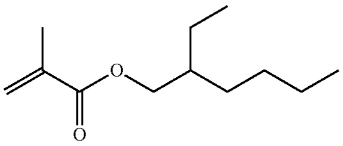

A-8

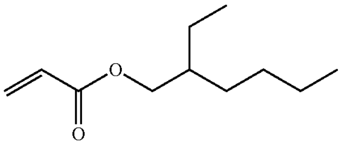

A-9

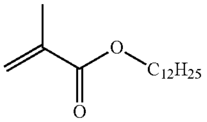

A-10

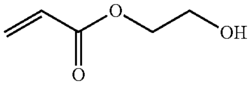

A-11

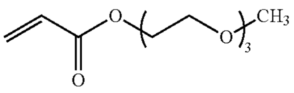

A-12

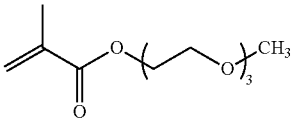

A-13

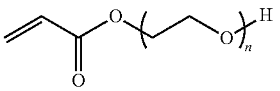

A-14

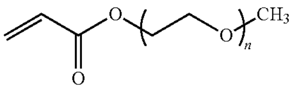

A-15

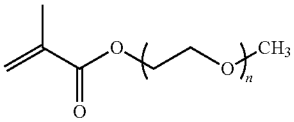

A-16

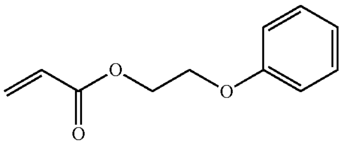

A-17

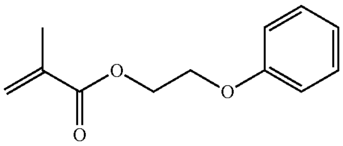

A-18

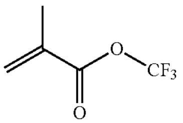

-continued
A-19
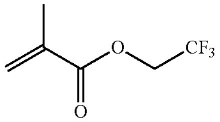
A-20
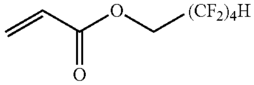
A-21
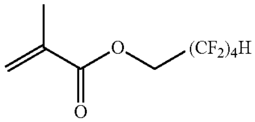
A-22
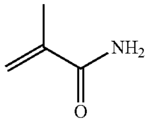
A-23
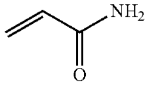
A-24
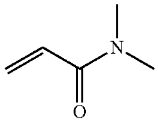
A-25
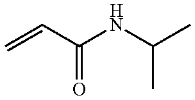
A-26
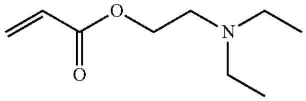
A-27
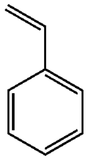
A-28
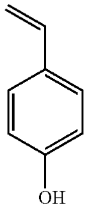
A-29
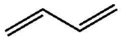
A-30
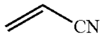
A-31
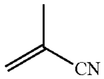
-continued
A-32
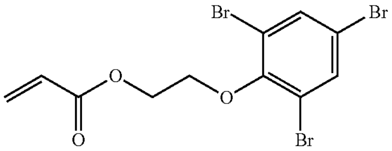
A-33
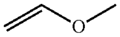
A-34
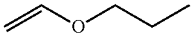
A-35
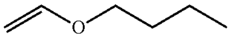
A-36
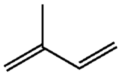
A-37
A-38
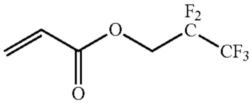
A-39
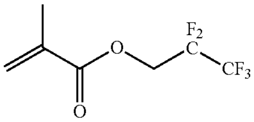
A-40
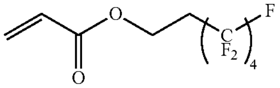
A-41
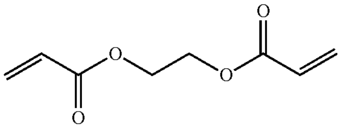
A-42
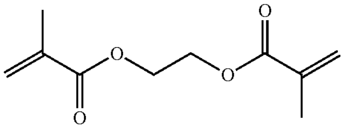
A-43
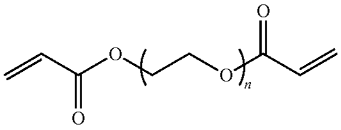
A-44
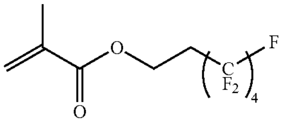
A-45
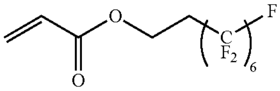

-continued
A-46
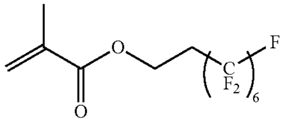
A-47
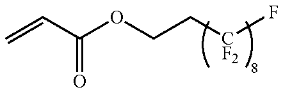
A-48
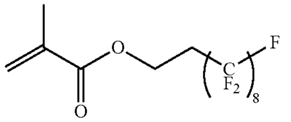
A-49
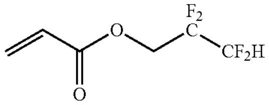
A-50
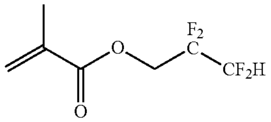
A-51
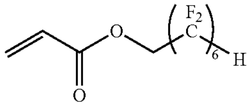
A-52
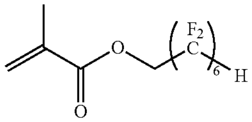
A-53
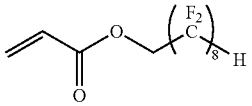
A-54
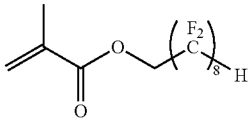
A-55
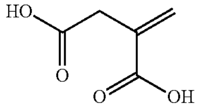
A-56
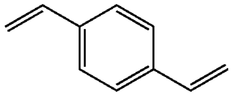
A-57
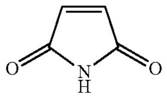
-continued
A-58
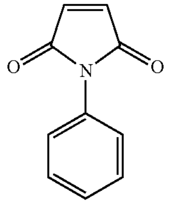
A-59
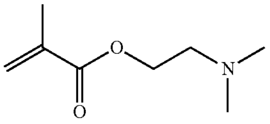
A-60
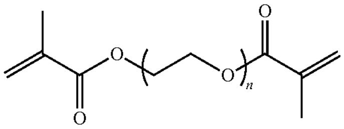
A-61
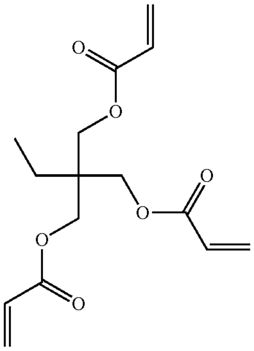
A-62
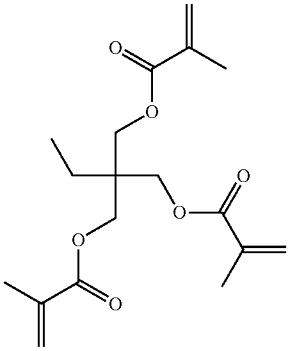
A-63
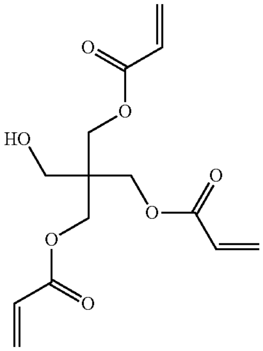

-continued
A-64
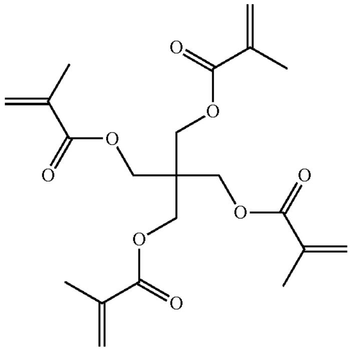
4-65
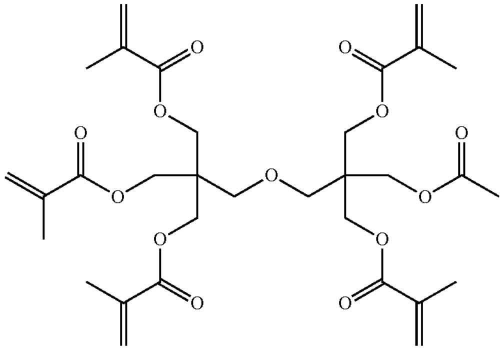
a-101
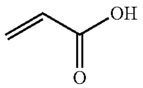
a-102
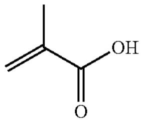
a-103
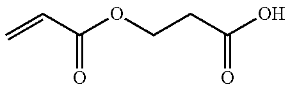
a-104
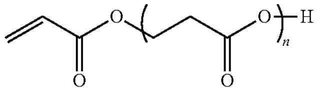
a-105
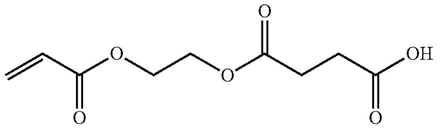
a-106
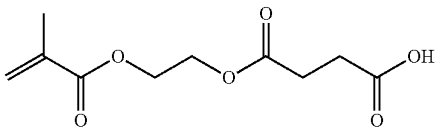
-continued
a-107
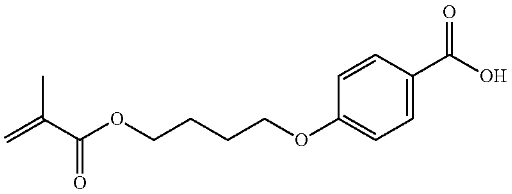
a-108
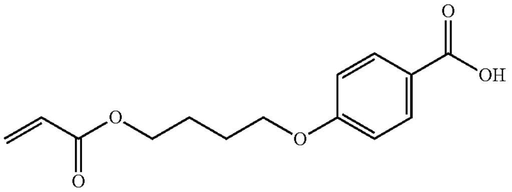
a-109
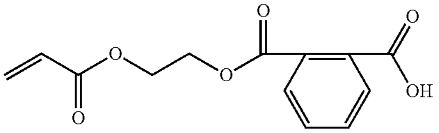
a-110
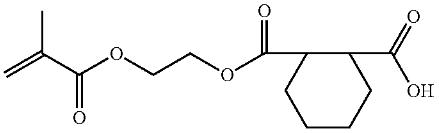
a-111
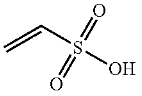
a-112
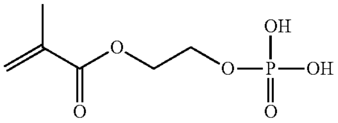
a-113
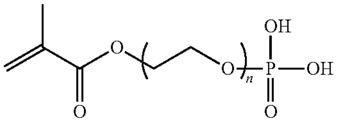
a-114
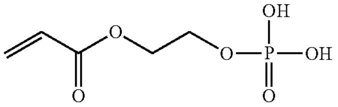
a-115
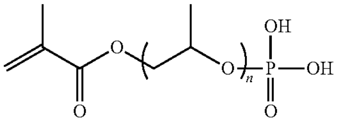
a-116
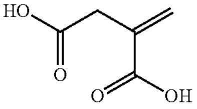
a-117
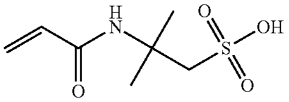

-continued a-118

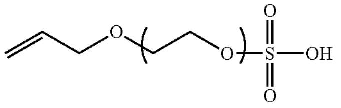

Examples of the method for introducing the acidic functional group include methods in which monomers containing acidic functional groups as exemplified by a are copolymerized during the polymerization of polymers having a repeating structure derived from the monomers of A. Alternatively, the functional groups may be introduced into polymer terminals by means of polymerization with an acidic functional group-containing initiator or chain transfer agent or acidic groups may be introduced into side chains or terminals by means of high-molecular-weight reactions. In addition, commercially available acidic functional group-containing polymers may also be used. Examples thereof include TUFTEC M1911 and TUFTEC M1913 manufactured by Asahi Kasei Corporation, SUMIFITT series manufactured by Sumika Chemtex Company, Limited., DYNARON4630P and DYNARON8630P manufactured by JSR Corporation, modification types of Nipol LX series manufactured by Zeon Corporation, KYNAR ADX series manufactured by Arkema Group, and the like. Amide groups or hydroxyl groups other than the acidic functional groups can also be combined with the specific polymer in the same manner.

The content (copolymerization proportion) of the repeating unit (monomer) having an acidic functional group of the above-described polymer in the polymer is preferably 1% by mass or more, more preferably 3% by mass or more, and particularly preferably 5% by mass or more in terms of the acidic equivalent. The upper limit is preferably 50% by mass or less, more preferably 30% by mass or less, and particularly preferably 20% by mass or less. When the content of the repeating unit having an acidic functional group of the polymer is adjusted in the above-described range, it is possible to satisfy both the self-forming properties and bonding properties of the solid electrolyte (SE) layer, which is preferable. Here, the content in terms of the acidic equivalent refers to a value obtained by multiplying the valence of the acidic functional group (the number of free protons) by the proportion of the corresponding repeating unit. For example, in a case in which one carboxylic group is present in the repeating unit, the above-described upper and lower limit values determine the preferred range of the repeating unit. In the case of two carboxylic groups (for example, a succinic acid group) or a phosphoric acid group, the number of free protons is two, and the equivalent reaches two. Therefore, values obtained by dividing the upper and lower limit values by two determine the preferred range of the repeating unit. For a phosphoric acid group (2 equivalent), similarly, a preferable copolymerization proportion of the repeating unit is a half proportion described above.

Side Chain Component (Macromonomer (X))

The weight-average molecular weight of the macromonomer is 1,000 or more, more preferably 2,000 or more, and particularly preferably 3,000 or more. The upper limit is preferably 500,000 or less, more preferably 100,000 or less, and particularly preferably 30,000 or less.

The side chain component in the specific polymer is considered to have an action of improving dispersibility in solvents. Therefore, the polymer is preferably dispersed in a particulate shape in solvents, and thus it is possible to solidify the binder without locally or fully coating the solid electrolyte. As a result, equal intervals are maintained between the polymer particles, and electric connection between the particles is not blocked. Therefore, it is considered that an increase in interface resistance between solid particles, between collectors, and the like is suppressed. Furthermore, when the polymer has a side chain, the polymer particles are not attached to the solid electrolyte particles, and an effect of twisting the side chains can also be expected. Therefore, it is considered that both of the suppression of interface resistance applied to the solid electrolyte and the improvement of bonding properties can be achieved. Furthermore, the favorable dispersibility enables the elimination of a step of layer transfer in organic solvents compared with in-water emulsification polymerization or the like and the use of a solvent having a low boiling point as a dispersion medium. Meanwhile, the molecular weight of the side chain component (X) can be identified by measuring the molecular weight of a polymerizable compound (macromonomer) being combined when the polymer is synthesized.

—Measurement of Molecular Weight—

Unless particularly otherwise described, the molecular weight of the polymer in the present invention refers to the weight-average molecular weight, and the standard polystyrene-equivalent weight-average molecular weight is measured by means of gel permeation chromatography (GPC). Regarding the measurement methods, basically, the weight-average molecular weight is measured using a method under the following conditions 1 or conditions 2 (preferred). However, depending on the kind of polymers, an appropriate eluent may be appropriately selected and used.

(Conditions 1)

Column: Two columns of TOSOH TSKgel Super AWM-H (trade name, manufactured by Tosoh Corporation) are connected Carrier: 10 mM LiBr/N-methylpyrrolidone Measurement temperature: 40° C.

Carrier flow rate: 1.0 ml/min

Specimen concentration: 0.1% by mass

Detector: RI (refractive index) detector (Conditions 2) Preferred

Column: A column obtained by connecting TOSOH TSKgel Super HZM-H,

TOSOH TSKgel Super HZ4000, and

TOSOH TSKgel Super HZ2000 is used

Carrier: Tetrahydrofuran

Measurement temperature: 40° C.

Carrier flow rate: 1.0 ml/min

Specimen concentration: 0.1% by mass

Detector: RI (refractive index) detector

The SP value of the macromonomer (X) is preferably 10 or less and more preferably 9.5 or less. The lower limit value is not particularly limited, but is realistically 5 or more.

—Definition of SP Value—

Unless particularly otherwise described, SP values in the present specification are obtained using a Hoy method (H. L. Hoy Journal of Painting, 1970, Vol. 42, 76-118). In addition, regarding SP values, the unit is not described, but is '$cal^{1/2}cm^{-3/2}$'. Meanwhile, the SP value of the side chain component (X) is almost the same as the SP value of the raw material monomer forming the side chain and may be evaluated using the SP value of the raw material monomer.

The main chain of the side chain component of the macromonomer (X) is not particularly limited, and an ordinary polymer component can be applied. The macromonomer (X) preferably has a polymerizable group at the terminal and more preferably has a polymerizable group at a single terminal or both terminals. The polymerizable group is preferably a group having a polymerizable unsaturated bond, and examples thereof include a variety of vinyl groups or (meth)acryloyl groups. In the present invention, the macromonomer (X) preferably has, among these, a (meth) acryloyl group.

Meanwhile, "acryl" or "acryloyl" mentioned in the present specification broadly refers not only to acryloyl groups but also to induced structures thereof, and the scope thereof includes structures having a specific substituent at an α position of the acryloyl group. However, in the narrow sense, there are cases in which structures having a hydrogen atom at the α position are referred to as acryl or acryloyl. There are cases in which structures having a methyl group at the a position are referred to as methacryl and structures which are any one of acryl (a hydrogen atom at the α position) or methacryl (a methyl group at the α position) are referred to as (meth)acryl or the like.

The macromonomer (X) preferably includes a repeating unit derived from a monomer selected from (meth)acrylic acid monomers, (meth)acrylic acid ester monomers, and (meth)acrylonitrile. In addition, the macromonomer (X) preferably includes a polymerizable double bond and a hydrocarbon structural unit S having 6 or more carbon atoms (preferably an alkylene group having 6 to 30 carbon atoms and more preferably an alkylene group or alkyl group having 8 to 24 carbon atoms). As described above, when the macromonomer has the hydrocarbon structural unit S, the affinity to solvents enhances, and an action of improving dispersion stability can be expected.

Here, when Macromonomer M-1 below is used as an example, the hydrocarbon structural unit S is dodecyl in a structure derived from dodecyl methacrylate.

The macromonomer (X) preferably has a portion represented by General Formula (P) below as a polymerizable group or a part thereof.

(P)

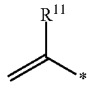

$R^{11}$ is the same as $R^1$. * is a bonding portion.

The polymerizable group in the macromonomer (X) is preferably a portion represented by any one of General Formulae (P-1) to (P-3). Hereinafter, these portions will be referred to as "specific polymerizable portions" in some cases.

(P-1)

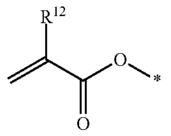

(P-2)

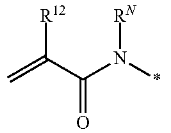

-continued (P-3)

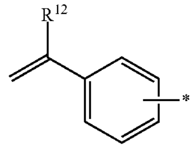

$R^{12}$ is the same as $R^1$. * is a bonding portion. $R^N$ is the same as the definition described in the section of the substituent T described below. The benzene ring in General Formula (P-3) may be substituted with an arbitrary substituent T.

The macromonomer (X) is preferably a compound represented by General Formulae (N-1) to (N-3) below.

(N-1)

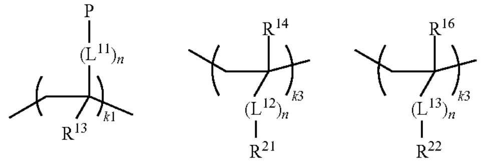

(N-2)

$$P-(L^{14})_n(CO-(L^{15})_q(O)_n)_m(L^{16})_n-R^{16}$$

(N-3)

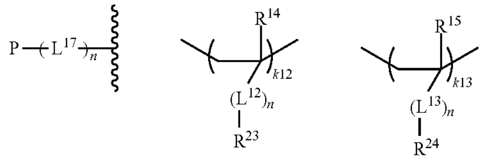

P is a polymerizable group. $L^{11}$ to $L^{17}$ each are independently a linking group. k1, k2, k3, k12, and k13 are molar fractions. m is an integer of 1 to 200. n is 0 or 1. $R^{13}$ to $R^{15}$, $R^{21}$, and $R^{23}$ each are independently a polymerizable group or $R^1$ (a hydrogen atom, a hydroxyl group, a cyano group, a halogen atom, a carboxyl group, an alkyl group, an alkenyl group, an alkynyl group, or an aryl group). $R^{16}$ is a hydrogen atom or a substituent. q is 0 or 1. $R^{22}$ is a chain-like structural portion having a higher molecular weight than $R^{21}$. $R^{24}$ is a hydrogen atom or a substituent.

P is a polymerizable group and preferably General Formula (P) or (P-1) to (P-3). $L^{11}$ to $L^{17}$ each are independently a linking group L and preferably the same as $L^1$.

In the present specification, the structure on the left end indicated using a wavy line in General Formula (N-3) represents at least one terminal structure of the main chain.

$L^{11}$ is preferably an alkylene group having 1 to 6 carbon atoms (preferably 1 to 3 carbon atoms), an arylene group having 6 to 24 carbon atoms (preferably 6 to 10 carbon atoms), an oxygen atom, a sulfur atom, an imino group ($NR^N$), a carbonyl group, a (poly)alkyleneoxy group, a (poly)ester group, a (poly)amide group, or a group according to a combination thereof. $L^{11}$ may have the substituent T and may have, for example, a hydroxyl group.

$L^{12}$ and $L^{13}$ are preferably an alkylene group having 1 to 6 carbon atoms (preferably 1 to 3 carbon atoms), an arylene group having 6 to 24 carbon atoms (preferably 6 to 10 carbon atoms), an oxygen atom, a sulfur atom, an imino group ($NR^N$), a carbonyl group, a (poly)alkyleneoxy group, a (poly)ester group, a (poly)amide group, or a group according to a combination thereof.

$L^{14}$ is preferably an alkylene group having 1 to 24 carbon atoms (preferably 1 to 18 carbon atoms), an arylene group having 6 to 24 carbon atoms (preferably 6 to 10 carbon atoms), an oxygen atom, a sulfur atom, an imino group ($NR^N$), a carbonyl group, a (poly)alkyleneoxy group, a (poly)ester group, a (poly)amide group, or a group according to a combination thereof and particularly preferably a (poly) alkyleneoxy group (x is 1 to 4). At this time, the number of carbon atoms in the alkylene group is preferably 1 to 12, more preferably 1 to 8, and particularly preferably 1 to 6. This alkylene group may have the substituent T and may have, for example, a hydroxyl group.

$L^{15}$ is, among these, preferably an alkylene group. $L^{15}$ is preferably a relatively long chain, and the number of carbon atoms is preferably 4 to 30, more preferably 6 to 20, and particularly preferably 6 to 16. $L^{15}$ may have an arbitrary substituent. Examples of the arbitrary substituent include the substituent T, and, specifically, $L^{15}$ may have an arbitrary substituent such as a halogen atom, a hydroxyl group, a carboxyl group, a thiol group, an acyl group, an acyloxy group, an alkoxy group, an aryloxy group, an aryloyl group, an aryloyloxy group, or an amino group.

$L^{16}$ preferably becomes a single bond (n=0).

$L^{17}$ is preferably an alkylene group having 1 to 6 carbon atoms (preferably 1 to 3 carbon atoms), an arylene group having 6 to 24 carbon atoms (preferably 6 to 10 carbon atoms), an oxygen atom, a sulfur atom, an imino group ($NR^N$), a carbonyl group, a (poly)alkyleneoxy group, a (poly)ester group, a (poly)amide group, or a group according to a combination thereof. $L^{17}$ may have the substituent T and may have, for example, a hydroxyl group.

n is 0 or 1.

$L^{11}$ to $L^{16}$ are, among these, preferably linking groups having 1 to 60 carbon atoms (preferably 1 to 30 carbon atoms) which are substituted with an oxygen atom, a carbon atom, a hydrogen atom, a sulfur atom or a nitrogen atom. The number of constituent atoms in the linking group is preferably 4 to 40 and more preferably 6 to 24.

k1, k2, and k3 are the molar fractions of individual repeating units in the polymers and k1+k2+k3=1. kl is preferably 0.001 to 0.3 and more preferably 0.01 to 0.1. k2 is preferably 0 to 0.7 and more preferably 0 to 0.5. k3 is preferably 0.3 to 0.99 and more preferably 0.4 to 0.9.

m represents an integer of 1 to 200 and is preferably an integer of 1 to 100 and more preferably an integer of 1 to 50.

k12 and k13 are the molar fractions of individual repeating units in the polymers and k12+k13=1. k12 is preferably 0 to 0.7 and more preferably 0 to 0.6. k13 is preferably 0.3 to 1 and more preferably 0.4 to 1.

$R^{13}$, $R^{14}$, and $R^{15}$ are the same groups as $R^1$ or the polymerizable groups as P. Among these, $R^{13}$, $R^{14}$, and $R^{15}$ are preferably $R^1$, and a hydrogen atom, an alkyl group (the number of carbon atoms is preferably 1 to 3), a cyano group are preferred.

$R^{16}$ is the same as $R^2$. Among these, a hydrogen atom, an alkylene group having 1 to 6 carbon atoms (preferably 1 to 3 carbon atoms), an arylene group having 6 to 24 carbon atoms (preferably 6 to 10 carbon atoms), a hydroxyl group, and a carboxyl group are preferred.

q is 0 or 1.

$R^{21}$ and $R^{23}$ are preferably the same groups as $R^1$.

$R^{22}$ is a chain-like structural portion having a higher molecular weight than $R^{21}$ and preferably an alkyl group (the number of carbon atoms is preferably 4 to 60 and more preferably 6 to 36), an alkenyl group (the number of carbon atoms is preferably 4 to 60 and more preferably 6 to 36), an arylene group (the number of carbon atoms is preferably 4 to 60 and more preferably 6 to 36), a halogenated alkyl group (the number of carbon atoms is preferably 4 to 60 and more preferably 6 to 36. The halogen atom is preferably a fluorine atom), a (poly)oxy alkylene group-containing group, a (poly)ester bond-containing group, a (poly)amide group-containing group, or a (poly)siloxane group-containing group. Examples of this portion include self-condensed substances of a hydroxyl group-containing aliphatic acid, self-condensed substances of an amino group-containing aliphatic acid, and the like. At this time, $R^{22}$ may have the substituent T and may appropriately have a hydroxyl group, an alkoxy group, an acyl group, or the like. The linking group-containing group follows the definition of the linking group L described below. The terminal group thereof is preferably $R^P$ described below.

$R^{24}$ is a hydrogen atom or a substituent and is preferably the same group as $R^2$. Among these, a hydrogen atom, an alkyl group (the number of carbon atoms is preferably 1 to 24, more preferably 1 to 18, and particularly preferably 1 to 12), an alkenyl group (the number of carbon atoms is preferably 2 to 12 and more preferably 2 to 6), an aryl group (the number of carbon atoms is preferably 6 to 22 and more preferably 6 to 14), and an aralkyl group (the number of carbon atoms is preferably 7 to 23 and more preferably 7 to 15) are preferred. At this time, $R^{24}$ may have the substituent T and may appropriately have a hydroxyl group, an alkoxy group, an acyl group, or the like. The linking group-containing group follows the definition of the linking group L described below. The terminal group thereof is preferably $R^P$ described below.

The specific polymer being used in the present invention is preferably polyurethane. The polyurethane can be obtained by means of polycondensation between a diisocyanate compound and a diol compound in the presence of a titanium, tin, or bismuth catalyst.

Diisocyanate Compound

The diisocyanate compound is not particularly limited and can be appropriately selected, and examples thereof include compounds represented by General Formula (M1) below.

$$OCN—R^{M1}—NCO \tag{M1}$$

Here, in General Formula (M1), $R^{M1}$ represents a divalent aliphatic group or aromatic hydrocarbon which may have a substituent (for example, preferably an alkyl group, an aralkyl group, an aryl group, an alkoxy group, or a halogen atom). $R^{M1}$ may have an additional functional group that does not react with an isocyanate group, for example, any one of an ester group (a group having an ester bond such as an acyloxy group, an alkoxycarbonyl group, or an aryloxycarbonyl group), an urethane group, an amide group, and an ureido group as necessary.

The diisocyanate compound represented by Formula (M1) is not particularly limited, and examples thereof include products and the like being obtained by causing an addition reaction among diisocyanate, a triisocyanate compound (the compound described in Paragraphs 0034, 0035, and the like of JP2005-250438A), and one equivalent of a monofunctional alcohol or monofunctional amine compound having an ethylenic unsaturated group (the compound described in Paragraphs 0037 to 0040 and the like of JP2005-250438A).

The diisocyanate compound represented by General Formula (M1) is not particularly limited and can be appropriately selected depending on the purposes. Meanwhile, a group represented by General Formula (M2) below is preferably included.

(M2)

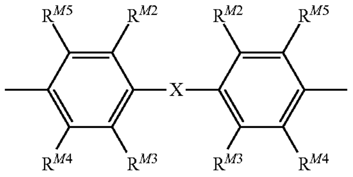

In General Formula (M2), X represents a single bond, $—CH_2—$, $—C(CH_3)_2—$, $—SO_2—$, —S—, —CO—, or —O—. From the viewpoint of bonding properties, $—CH_2—$ or —O— is preferred, and $—CH_2—$ is more preferred. The above-described alkylene group exemplified here may also be substituted with a halogen atom (preferably a fluorine atom).

$R^{M2}$ to $R^{M5}$ each independently represent a hydrogen atom, a monovalent organic group, a halogen atom, $—OR^{M6}$, $—N(R^{M6})_2$, or $—SR^{M6}$. $R^{M6}$ represents a hydrogen atom or a monovalent organic group.

Examples of the monovalent organic group include an alkyl group having 1 to 20 carbon atoms, an alkenyl group having 1 to 20 carbon atoms, $—OR^{M7}$ [here, $R^{M7}$ represents a monovalent organic group (preferably an alkyl group having 1 to 20 carbon atoms, an aryl group having 6 to 10 carbon atoms, or the like)], an alkylamino group (the number of carbon atoms is preferably 1 to 20 and more preferably 1 to 6), an arylamino group (the number of carbon atoms is preferably 6 to 40 and more preferably 6 to 20), and the like.

$R^{M2}$ to $R^{M5}$ are preferably hydrogen atoms, alkyl groups having 1 to 20 carbon atoms, or $—OR^{M7}$, more preferably hydrogen atoms or alkyl groups having 1 to 20 carbon atoms, and still more preferably hydrogen atoms. Examples of the halogen atom include a fluorine atom, a chlorine atom, and a bromine atom.

The diisocyanate compound represented by Formula (M1) more preferably includes a group represented by General Formula (M3) below.

(M3)

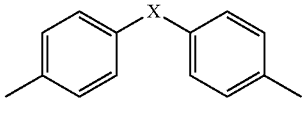

In General Formula (M3), X is the same as X in General Formula (M2), and a preferred range thereof is also identical.

The compositional ratio of the aromatic group represented by Formulae (M1) to (M3) in the polymer is preferably 10 mol % or more, more preferably 10 mol % to 50 mol %, and still more preferably 30 mol % to 50 mol %.

The diisocyanate compound represented by Formula (M1) are not particularly limited and can be appropriately selected depending on the purposes. Examples thereof include aromatic diisocyanate compounds such as 2,4-tolylene diisocyanate, dimers of 2,4-tolylene diisocyanate, 2,6-tolylene diisocyanate, p-xylylene diisocyanate, m-xylylene diisocyanate, 4,4'-diphenylmethane diisocyanate (MDI), 1,5-naphthylene diisocyanate, and 3,3'-dimethylbiphenyl-4,4'-diisocyanate; aliphatic diisocyanate compounds such as hexamethylene diisocyanate, trimethylhexamethylene diisocyanate, lysine diisocyanate, and dimer acid diisocyanate; alicyclic diisocyanate compounds such as isophorone diisocyanate, 4,4'-methylene bis(cyclohexyl isocyanate), methylcyclohexane-2,4 (or 2,6) diisocyanate, and 1,3-(isocyanatomethyl) cyclohexane; diisocyanate compounds which are reaction products between a diol and a diisocyanate such as adduct of one mole of 1,3-butylene glycol and two moles of tolylene diisocyanate; and the like. These diisocyanate compounds may be used singly or two or more diisocyanate compounds may be jointly used. Among these, 4,4'-diphenylmethane diisocyanate (MDI) is preferred.

Specific examples of the diol compound include ethylene glycol, diethylene glycol, triethylene glycol, tetraethylene glycol, propylene glycol, dipropylene glycol, polyethylene glycol, polypropylene glycol, neopentyl glycol, 1,3-butylene glycol, 1,6-hexanediol, 2-butene-1,4-diol, 2,2,4-trimethyl-1,3-pentanediol, 1,4-bis-β-hydroxyethoxycyclohexane, cyclohexane dimethanol, tricyclodecane dimethanol, hydrogenated bisphenol A, hydrogenated bisphenol F, ethylene oxide adducts of bisphenol A, propylene oxide adducts of bisphenol A, ethylene oxide adducts of bisphenol F, propylene oxide adducts of bisphenol F, ethylene oxide adducts of hydrogenated bisphenol A, propylene oxide adducts of hydrogenated bisphenol A, hydroquinone dihydroxyethyl ether, p-xylylene glycol, dihydroxyethyl sulfone, bis(2-hydroxyethyl)-2,4-tolylene dicarbamate, 2,4-tolylene-bis(2-hydroxyethylcarbamide), bis(2-hydroxyethyl)-m-xylylene dicarbamate, bis(2-hydroxyethyl) isophthalate, 1,3-propanediol, 1,4-butanediol, 1,5-pentanediol, 1,6-hexanediol, 1,7-heptanediol, 1,8-octanediol, 1,10-decanediol, 2-butene-,4-diol, cis-2-butene-,4-diol, trans-2-butene-1,4-diol, catechol, resorcin, hydroquinone, 4-methylcatechol, 4-t-butylcatechol, 4-acetylcatechol, 3-methoxycatechol, 4-phenylcatechol, 4-methylresorcin, 4-ethylresorcin, 4-t-butylresorcin, 4-hexylresorcin, 4-chlororesorcin, 4-benzylresorcin, 4-acetylresorcin, 4-carbomethoxyresorcin, 2-methylresorcin, 5-methylresorcin, t-butylhydroquinone, 2,5-di-t-butylhydroquinone, 2,5-di-t-amylhydroquinone, tetramethylhydroquinone, tetrachlorohydroquinone, methylcarboaminohydroquinone, methylureidohydroquinone, methylthiohydroquinone, benzonorbomene-3,6-diol, bisphenol A, bisphenol S, 3,3'-dichlorobisphenol S, 4,4'-dihydroxybenzophenone, 4,4'-dihydroxybiphenyl, 4,4'-thiodiphenol, 2,2'-dihydroxydiphenylmethane, 3,4-bis(p-hydroxyphenyl)hexane, 1,4-bis(2-(p-hydroxyphenyl)propyl) benzene, bi s(4-hydroxyphenyl)methylamine, 1,3 -dihydroxynaphthalene, 1,4-dihydroxynaphthalene, 1,5 -dihydroxynaphthalene, 2,6-dihydroxynaphthalene, 1,5-dihydroxyanthraquinone, 2-hydroxybenzyl alcohol, 4-hydroxybenzyl alcohol, 2-hydroxy-3,5-di-t-butylbenzyl alcohol, 4-hydroxy-3,5-di-t-butylbenzyl alcohol, 4-hydroxyphenethyl alcohol, 2-hydroxyethyl-4-hydroxybenzoate, 2-hydroxyethyl-4-hydroxyphenylacetate, resorcine mono-2-hydroxyethyl ether, diethylene glycol, triethylene glycol, tetraethylene glycol, pentaethylene glycol, hexaethylene glycol, heptaethylene glycol, octaethylene glycol, di-1,2-propylene glycol, tri-1,2-propylene glycol, tetra-1,2-propylene glycol, hexa-1,2-propylene glycol, di-1,3-propylene glycol, tri-1,3-propylene glycol, tetra-1,3-propylene glycol, di-1,3-butylene glycol, tri-1,3-butylene glycol, hexa-1,3-butylene glycol, polyethylene glycol having an average molecular weight of 200, polyethylene glycol having an average molecular weight of 400, polyethylene glycol having an average molecular weight of 600, polyethylene glycol having an average molecular weight of 1,000, polyethylene glycol having an average molecular weight of 1,500, polyethylene glycol having an average molecular weight of 2,000, polyethylene glycol having an average molecular weight of 3,000, polyethylene glycol having an average molecular weight of 7,500, polypropylene glycol having an average molecular weight of 400, polypropylene glycol having an average molecular weight of 700, polypropylene glycol having an average molecular weight of 1,000, polypropylene glycol having an average molecular weight of 2,000, polypropylene glycol having an average molecular weight of 3,000, polypropylene glycol having an average molecular weight of 4,000, and the like.

The diol compound can also be procured from commercially available products. Examples thereof include polyether diol compounds, furthermore, polyester diol compounds, polycarbonate diol compounds, and silicone diol compounds such as PTMG650, PTMG1000, PTMG20000, PTMG3000, NEWPOL PE-61, NEWPOL PE-62, NEWPOL PE-64, NEWPOL PE-68, NEWPOL PE-71, NEWPOL PE-74, NEWPOL PE-75, NEWPOL PE-78, NEWPOL PE-108, NEWPOL PE-128, NEWPOL BPE-20, NEWPOL BPE-20F, NEWPOL BPE-20NK, NEWPOL BPE-20T, NEWPOL BPE-20G, NEWPOL BPE-40, NEWPOL BPE-60, NEWPOL BPE-100, NEWPOL BPE-180, NEWPOL BP-2P, NEWPOL BPE-23P, NEWPOL BPE-3P, NEWPOL BPE-5P, NEWPOL 50HB-100, NEWPOL 50HB-260, NEWPOL 50HB-400, NEWPOL 50HB-660, NEWPOL 50HB-2000, and NEWPOL 50HB-5100 manufactured by Sanyo Chemical Industries, Ltd.

As the polyester diol compounds, it is possible to preferably use POLYLITE series (manufactured by DIC Corporation), KURARAY POLYOL P series, KURARAY POLYOL F series, KURARAY POLYOL N series, KURARAY POLYOL PMNA series (manufactured by Kuraray Co., Ltd.), and PLACCEL series (manufactured by Daicel Corporation).

As the polycarbonate diol compounds, it is possible to preferably use DURANOL series (manufactured by Asahi Kasei Corporation), ETERNACOLL series (manufactured by Ube Industries, Ltd.), PLACCEL CD series (manufactured by Daicel Corporation), and KURARAY POLYOL C series (manufactured by Kuraray Co., Ltd.).

As the silicone diol compounds, it is possible to use carbinol-modified silicone oil manufactured by Shin-Etsu Chemical Co., Ltd. Specifically, it is possible to preferably use KF-6000, KF-6001, KF-6002, KF-6003, and the like.

In addition, it is also possible to use the diol compound in combination with a diol compound containing a carboxyl group such as 3,5-dihydroxy benzoic acid, 2,2-bis(hydroxymethyl) propionic acid, 2,2-bis(2-hydroxyethyl) propionic acid, 2,2-bis(3-hydroxypropyl) propionic acid, bis (hydroxymethyl) acetic acid, bis(4-hydroxyphenyl) acetic acid, 2,2-bis(hydroxymethyl) butyric acid, 4,4-bis(4-hydroxyphenyl) pentanoic acid, tartaric acid, N,N-dihydroxyethylglycine, or N,N-bis(2-hydroxyethyl)-3-carboxy-propionamide .

In addition, it is also possible to preferably use the diol compounds described in JP2003-177533A, JP1999-352691A (JP-H11-352691A), JP1998-260530A (JP-H10-260530A), JP2005-250158A, and JP2009-86321A.

Diols preferably have a polyethylene oxide chain, a polypropylene oxide chain, a polycarbonate chain, a polyester chain, or a silicone chain. In addition, diols preferably have a carbon-carbon unsaturated group or a polar group (an alcoholic hydroxyl group, a phenolic hydroxyl group, a mercapto group, a carboxyl group, a sulfo group, a sulfonamide group, a phosphoric acid group, a cyano group, an amino group, a zwitter ion-containing group, a metal hydroxide group, or a metal alkoxide group). As diols having a carbon-carbon unsaturated group or a polar group, it is possible to use, for example, 2,2-bis(hydroxymethyl) propionic acid.

As diol compounds containing a carbon-carbon unsaturated group, it is possible to preferably use, in addition to BLEMMER GLM (manufactured by NOF Corporation) as a commercially available product, the compound described in JP2007-187836A.

In the case of the polyurethane, as a polymerization terminator, it is possible to use monoalcohols or monoamines. The polymerization terminator is introduced into the terminal portion of the polyurethane main chain. As a method for introducing soft segments into polyurethane terminals, it is possible to use polyalkylene glycol monoalkyl ethers (polyethylene glycol monoalkyl ethers and polypropylene monoalkyl ethers are preferable), polycarbonate diol monoalkyl ethers, polyester diol monoalkyl ethers, polyester monoalcohols, and the like.

In addition, when the monoalcohol or monoamine having a polar group or carbon-carbon unsaturated group is used, it is possible to introduce the polar group or carbon-carbon unsaturated group into the terminal of the polyurethane main chain. Examples thereof include hydroxyacetic acid, hydroxypropionic acid, 4-hydroxybenzyl alcohol, 3-mercapto-1 propanol, 2,3-dimercapto-1-propanol, 3-mercapto-1-hexanol, 3-hydroxypropanesulfonic acid, 2-cyanoethanol, 3-hydroxyglutaronitrile, 2-aminoethanol, 2-hydroxyethyl methacrylate, 2-hydroxyethyl acrylate, 2-aminoethyl methacrylate, 2-aminoethyl acrylate, and the like.

In the case of the polyurethane, it is preferable that the isocyanate compound portion functions as a hard segment and the diol compound portion functions as a soft segment.

In the present specification, regarding the expression of compounds (for example, when referred to as "~ compound"), these compounds are used to mention not only the compounds but also salts thereof and ions thereof. In addition, the scope of these compounds include derivatives obtained by partially changing the compound such as introducing substituents into the compound as long as the desired effects are exhibited.

In the present specification, substituents which are not clearly expressed as substituted or unsubstituted (which is also true for linking groups) may have an arbitrary substituent in the groups unless particularly otherwise described. This is also true for compounds which are not clearly expressed as substituted or unsubstituted. Examples of preferred substituents include the following substituent T.

Examples of the substituent T include the following substituents.

Alkyl groups (preferably alkyl groups having 1 to 20 carbon atoms, for example, methyl, ethyl, isopropyl, t-butyl, pentyl, heptyl, 1-ethylpentyl, benzyl, 2-ethoxyethyl, 1-carboxymethyl, and the like), alkenyl groups (preferably alkenyl groups having 2 to 20 carbon atoms, for example, vinyl, allyl, oleyl, and the like), alkynyl groups (preferably alkynyl groups having 2 to 20 carbon atoms, for example, ethynyl, butadiynyl, phenylethynyl, and the like), cycloalkyl groups (preferably cycloalkyl groups having 3 to 20 carbon atoms, for example, cyclopropyl, cyclopentyl, cyclohexyl, 4-methylcyclohexyl, and the like; in the present specification, the scope of alkyl groups, generally, also includes cycloalkyl groups), aryl groups (preferably aryl groups having 6 to 26 carbon atoms, for example, phenyl, 1-naphthyl, 4-methoxyphenyl, 2-chlorophenyl, 3-methylphenyl, and the like), heterocyclic groups (preferably heterocyclic groups having 2 to 20 carbon atoms, preferably heterocyclic groups of a five- or six-membered ring having at least one oxygen atom, sulfur atom, or nitrogen atom, for example, tetrahydropyranyl, tetrahydropyranyl, 2-pyridyl, 4-pyridyl, 2-imidazolyl, 2-benzimidazolyl, 2-thiazolyl, 2-oxazolyl, a pyrrolidone group, and the like), alkoxy groups (preferably alkoxy groups having 1 to 20 carbon atoms, for example, methoxy, ethoxy, isopropyloxy, benzyloxy, and the like), aryloxy groups (preferably aryloxy groups having 6 to 26 carbon atoms, for example, phenoxy, 1-naphthyloxy, 3-methylphenoxy, 4-methoxyphenoxy, and the like; in the present specification, the scope of alkoxy groups, generally, also includes aryloyl groups), alkoxycarbonyl groups (preferably alkoxycarbonyl groups having 2 to 20 carbon atoms, for example, ethoxycarbonyl, 2-ethylhexyloxycarbonyl, and the like), aryloxycarbonyl groups (preferably aryloxycarbonyl groups having 6 to 26 atoms, for example, phenoxycarbonyl, 1-naphthyloxycarbonyl, 3-methylphenoxycarbonyl, 4-methoxyphenoxycarbonyl, and the like), amino groups (preferably amino groups having 0 to 20 carbon atoms, including an alkylamino group and an arylamino group, for example, amino, N,N-dimethylamino, N,N-diethylamino, N-ethylamino, anilino, and the like), sulfamoyl groups (preferably sulfamoyl groups having 0 to 20 carbon atoms, for example, N,N-dimethylsulfamoyl, N-phenylsulfamoyl, and the like), acyl groups (preferably acyl groups having 1 to 20 carbon atoms, for example, acetyl, propionyl, butyryl, and the like), aryloyl groups (preferably aryloyl groups having 7 to 23 carbon atoms, for example, benzoyl; here, in the present specification, the scope of acyl groups generally include aryloyl groups), acyloxy groups (preferably acyloxy groups having 1 to 20 carbon atoms, for example, acetyloxy, and the like), aryloyloxy groups (preferably aryloyloxy groups having 7 to 23 carbon atoms, for example, benzoyloxy and the like; in the present specification, the scope of acyloxy groups, generally, also includes aryloyloxy groups), carbamoyl groups (preferably carbamoyl groups having 1 to 20 carbon atoms, for example, N,N-dimethylcarbamoyl, N-phenylcarbamoyl, and the like), acylamino groups (preferably acylamino groups having 1 to 20 carbon atoms, for example, acetylamino, benzoylamino, and the like), alkylthio groups (preferably alkylthio groups having 1 to 20 carbon atoms, for example, methylthio, ethylthio, isopropylthio, benzylthio, and the like), arylthio groups (preferably arylthio groups having 6 to carbon atoms, for example, phenylthio, 1-naphthylthio, 3-methylphenylthio, 4-methoxyphenylthio, and the like), alkylsulfonyl groups (preferably alkylsulfonyl groups having 1 to 20 carbon atoms, for example, methylsulfonyl, ethylsulfonyl, and the like), arylsulfonyl groups (preferably arylsulfonyl groups having 6 to 22 carbon atoms, for example, benzenesulfonyl and the like), alkylsilyl groups (preferably alkylsilyl groups having 1 to 20 carbon atoms, for example, monomethylsilyl, dimethylsilyl, trimethylsilyl, triethylsilyl, and the like), arylsilyl groups (preferably arylsilyl groups having 6 to 42 carbon atoms, for example, triphenylsilyl, and the like), alkoxysilyl groups (preferably alkoxysilyl groups having 1 to 20 carbon atoms, for example, monomethoxysilyl, dimethoxysilyl, trimethoxysilyl, triethoxysilyl, and the like), aryloxysilyl groups (preferably aryloxysilyl groups having 6 to 42 carbon atoms, for example, triphenyloxysilyl and the like), phosphoryl groups (preferably phosphoryl groups having 0 to 20 carbon atoms, for example, $—OP(=O)(R^P)_2$), phosphonyl groups (preferably phosphonyl groups having 0 to 20 carbon atoms, for example, $—P(=O)(R^P)_2$), phosphinyl groups (preferably phosphinyl groups having 0 to 20 carbon atoms, for example, $—P(R^P)_2$), a (meth)acryloyl group, a (meth)acryloyloxy group, a (meth)acryloylimino group ((meth)acrylamide group), a hydroxyl group, a thiol group, a carboxyl group, a phosphoric acid group, a phosphonic acid group, a sulfonic acid group, a cyano group, halogen atoms (for example, a fluorine atom, a chlorine atom, a bromine atom, an iodine atom, and the like).

In addition, in the respective groups exemplified as the substituent T, the substituent T may be further substituted.

In addition, when the substituent is an acid group or a basic group, a salt thereof may be formed.

When the compound, the substituent, the linking group, or the like includes an alkyl group, an alkylene group, an alkenyl group, an alkenylene group, an alkynyl group, an alkylene group, or the like, these may have a ring shape or a chain shape, may be a straight chain or branched, and may be substituted as described above or not substituted.

The respective substituents determined in the present specification may be substituted by interposing the following linking group L as long as the effects of the present invention are exhibited or may have the linking group L interposed in the structure. For example, an alkyl group, an alkylene group, an alkenyl group, an alkenylene group, or the like may further have the following hetero linking group in the structure.

The linking group L is preferably a hydrocarbon linking group [an alkylene group having 1 to 10 carbon atoms (the number of carbon atoms is more preferably 1 to 6 and still more preferably 1 to 3), an alkenylene group having 2 to 10 carbon atoms (the number of carbon atoms is more preferably 2 to 6 and still more preferably 2 to 4), an alkynylene group having 2 to 10 carbon atoms (the number of carbon atoms is more preferably 2 to 6 and still more preferably 2 to 4), an arylene group having 6 to 22 carbon atoms (the number of carbon atoms is more preferably 6 to 10), or a combination thereto], a hetero linking group [a carbonyl group (—CO—), a thiocarbonyl group (—CS—), an ether group (—O—), a thioether group (—S—), an imino group ($—NR^N—$), an ammonium linking group ($—NR^N{}_2{}^+—$), a polysulfide group (the number of S's is preferably 1 to 8), an imino linking group ($R^N—N=C<$ or $—N=C(R^N)—$), a sulfonyl group ($—SO_2—$), a sulfinyl group (—SO—), a phosphoric acid linking group (—O—P(OH)(O)—O—), a phosphonic acid linking group (—P(OH)(O)—O—), or a combination thereof], or a linking group obtained by combining these linking groups. Meanwhile, in a case in which substituents or linking groups are condensed together and thus form a ring, the hydrocarbon linking group may approximately form a double bond or a triple bond and link the groups. Rings being formed are preferably five-membered rings or six-membered rings. The five-membered rings are preferably nitrogen-containing five-membered rings, and examples of compounds forming the ring include pyrrole, imidazole, pyrazole, indazole, indole, benzimidazole, pyrrolidine, imidazolidine, pyrazolidine, indoline, carbazole, derivatives thereof, and the like. Examples of the six-membered rings include piperidine, morpholine, piperazine, derivatives thereof, and the like. In addition, when an aryl group, a heterocyclic group, or the like is included, these may be a single ring or a condensed ring and may be, similarly, substituted or not substituted.

$R^N$ is a hydrogen atom or a substituent. The substituent is preferably an alkyl group (the number of carbon atoms is preferably 1 to 24, more preferably 1 to 12, still more preferably 1 to 6, and particularly preferably 1 to 3), an alkenyl group (the number of carbon atoms is preferably 2 to 24, more preferably 2 to 12, still more preferably 2 to 6, and particularly preferably 2 and 3), an alkynyl group (the number of carbon atoms is preferably 2 to 24, more preferably 2 to 12, still more preferably 2 to 6, and particularly preferably 2 and 3), an aralkyl group (the number of carbon atoms is preferably 7 to 22, more preferably 7 to 14, and particularly preferably 7 to 10), or an aryl group (the number of carbon atoms is preferably 6 to 22, more preferably 6 to 14, and particularly preferably 6 to 10).

$R^P$ represents a hydrogen atom, a hydroxyl group, or a substituent. The substituent is preferably an alkyl group (the number of carbon atoms is preferably 1 to 24, more preferably 1 to 12, still more preferably 1 to 6, and particularly preferably 1 to 3), an alkenyl group (the number of carbon atoms is preferably 2 to 24, more preferably 2 to 12, still more preferably 2 to 6, and particularly preferably 2 and 3), an alkynyl group (the number of carbon atoms is preferably 2 to 24, more preferably 2 to 12, still more preferably 2 to 6, and particularly preferably 2 and 3), an aralkyl group (the number of carbon atoms is preferably 7 to 22, more preferably 7 to 14, and particularly preferably 7 to 10), an aryl group (the number of carbon atoms is preferably 6 to 22, more preferably 6 to 14, and particularly preferably 6 to 10), an alkoxy group (the number of carbon atoms is preferably 1 to 24, more preferably 1 to 12, still more preferably 1 to 6, and particularly preferably 1 to 3), an alkenyl group (the number of carbon atoms is preferably 2 to 24, more preferably 2 to 12, still more preferably 2 to 6, and particularly preferably 2 and 3), an alkynyloxy group (the number of carbon atoms is preferably 2 to 24, more preferably 2 to 12, still more preferably 2 to 6, and particularly preferably 2 and 3), an aralkyloxy group (the number of carbon atoms is preferably 7 to 22, more preferably 7 to 14, and particularly preferably 7 to 10), or an aryloxy group (the number of carbon atoms is preferably 6 to 22, more preferably 6 to 14, and particularly preferably 6 to 10).

The number of atoms constituting the linking group L is preferably 1 to 36, more preferably 1 to 24, still more preferably 1 to 12, and particularly preferably 1 to 6. The number of linking atoms in the linking group is preferably 10 or less and more preferably 8 or less. The lower limit is 1 or more.

The number of the linking atoms refers to the minimum number of atoms which are located in paths connecting the predetermined structural portions and participate in the linkage. For example, in the case of $—CH_2—C(=O)—O—$, the number of atoms constituting the linking group is six, but the number of linking atoms is three.

Specific examples of combinations of the linking groups include the following combinations: an oxycarbonyl group (—OCO—), a carbonate group (—OCOO—), an amide group ($—CONR^N—$), an urethane group ($—NR^NCOO—$), a urea group ($—NR^NCONR^N—$), a (poly)alkyleneoxy group (-(Lr-O)x-), a carbonyl (poly)oxyalkylene group (—CO—(O—Lr)x-), a carbonyl (poly)alkyleneoxy group (—CO—(Lr—O)x-), a carbonyloxy (poly)alkyleneoxy group (—COO—(Lr—O)x-), a (poly)alkyleneimino group ($—(Lr—NR^N)x$), an alkylene (poly)iminoalkylene group ($—Lr—(NR^N—Lr)x-$), a carbonyl (poly)iminoalkylene group ($—CO—(NR^N—Lr)x-$), a carbonyl (poly)alkyleneimino group ($—CO—(Lr—NR^N)x-$), a (poly)ester group (—(CO—O—Lr)x-, —(O—CO—Lr)x-, —(O—Lr—CO)x-, —(Lr—CO—O)x-, —(Lr—O—CO)x-), a (poly)amide group ($—(CO—NR^N—Lr)x-$, $—(NR^N—CO—Lr)x-$, —(N—Lr—CO)x-, $—(Lr—CO—NR^N)x-$, $—(Lr—NR^N—CO)x-$), a polysiloxane group ($—SiR^P{}_2-)x$, and the like. x is an integer of 1 or more, preferably 1 to 500, and more preferably 1 to 100.

Lr is preferably an alkylene group, an alkenyl group, or an alkynylene group. The number of carbon atoms in Lr is preferably 1 to 12, more preferably 1 to 6, and particularly preferably 1 to 3 (for the alkenylene group and the alkynylene group, the lower limit of the number of carbon atoms is 2 or more). A plurality of Lr's, $R^N$'s, $R^P$'s, x's, and the like do not need to be identical to each other. The orientation of the linking groups is not limited to the above-described order and may be any orientation as long as the orientation is understood to be approximately in accordance with a predetermined chemical formula.

Into the macromonomer (X), the specific functional group (acidic functional group or the like) may be introduced. The introduction method needs to be a determined method and is the same as described in the section of the main chain.

The copolymerization proportion of a repeating unit derived from the macromonomer (X) is not particularly limited, but is preferably 1% by mass or more, more preferably 3% by mass or more, and particularly preferably 5% by mass or more in the polymer constituting the binder particles. The upper limit is preferably 50% by mass or less, more preferably 30% by mass or less, and particularly preferably 20% by mass or less.

Weight-average molecular weight of specific polymer

The weight-average molecular weight of the specific polymer is preferably 5,000 or more, more preferably 10,000 or more, and particularly preferably 30,000 or more. The upper limit is preferably 1,000,000 or less and more preferably 200,000 or less. Meanwhile, in a case in which the specific polymer is crosslinked and the molecular weight cannot be measured, what has been described above is not applicable.

The specific polymer may be used singly or a plurality of specific polymers may be used in combination. In addition, the specific polymer may be used in combination with other particles.

In the present invention, the specific polymer is preferably particles. In a case in which the specific polymer is particles, the volume-average particle diameter of the specific polymer is 30 um or less, more preferably 20 um or less, more preferably 1 um or less, still more preferably 700 nm or less, still more preferably 500 nm or less, and particularly preferably 300 nm or less. The lower limit value is preferably set to 10 nm or more and is more preferably 30 nm or more, still more preferably 50 nm or more, and particularly preferably 100 nm or more. Unless particularly otherwise described, the average particle diameter of the specific polymer in the present invention is measured according to the conditions and definition in which the average particle diameter of the binder is measured in the section of examples below. When the size of the specific polymer is set in the above-described range, it is possible to effectively realize favorable bonding properties, suppression of interface resistance, and furthermore, formation of gradient structures.

Meanwhile, the measurement from a produced all solid state secondary battery can be carried out by, for example, disassembling the battery, peeling the electrodes off, then, carrying out measurement on the electrode materials on the basis of the method for measuring the particle diameter of the polymer described below, and excluding the measurement values of the particle diameters of particles other than the polymer which have been measured in advance.

The amount of the specific polymer blended is preferably 0.1 parts by mass or more, more preferably 1 part by mass or more, and particularly preferably 3 parts by mass or more with respect to 100 parts by mass of the solid electrolyte (including the active material in the case of being used). The upper limit is preferably 30 parts by mass or less, more preferably 20 parts by mass or less, and particularly preferably 15 parts by mass or less. When the polymer is used in the above-described range, it is possible to satisfy both the self-forming properties and interface resistance-suppressing properties of the solid electrolyte (SE) layer, which is preferable.

In the solid electrolyte composition, the amount of the specific polymer in the solid component is preferably 0.1% by mass or more, more preferably 1% by mass or more, still more preferably 3% by mass or more, and particularly preferably 2% by mass or more. The upper limit is preferably 30% by mass or less, more preferably 20% by mass or less, still more preferably 15% by mass or less, and particularly preferably 5% by mass or less. Blending into this solid content is substantially the same as the amount in products (electrode layers).

(Dispersion Medium)

In the solid electrolyte composition of the present invention, a dispersion medium dispersing the respective components described above may be used. Examples of the dispersion medium include water-soluble organic solvents. Specific examples of the dispersion medium include the following media.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, dipropylene glycol monomethyl ether, tripropylene glycol monomethyl ether, diethylene glycol monobutyl ether, and the like), dimethyl ether, diethyl ether, diisopropyl ether, dibutyl ether, tetrahydrofuran, and dioxane.

Examples of amide compound solvents include N,N-dimethylformamide, 1-methyl-2-pyrrolidone, 2-pyrrolidinone, 1,3-dimethyl-2-imidazolidinone, 2-pyrrolidinone, ε-caprolactam, formamide, N-methylformamide, acetamide, N-methylacetamide, N,N-dimethylacetamide, N-methylpropaneamide, and hexamethylphosphoric triamide.

Examples of amino compound solvents include triethylamine, diisopropylethylamine, tributylamine, and the like.

Examples of ketone compound solvents include acetone, methyl ethyl ketone, methyl isobutyl ketone, and cyclohexanone.

Examples of aromatic compound solvents include benzene, toluene, xylene, and the like.

Examples of aliphatic compound solvents include hexane, heptane, octane, and the like.

Examples of nitrile compound solvents include acetonitrile, propiroitrile, butyronitrile, and the like.

In the present invention, among these, the ether compound solvents, the amino compound solvents, the ketone compound solvents, the aromatic compound solvents, and the aliphatic compound solvents are preferably used, and, among these, the Clog P value is preferably −1 or more. When the Clog P value is set in the above-described range, the affinity to the active materials and the solvents deteriorates, and it is possible to accelerate the precipitation of the active materials. The boiling point of the dispersion medium at normal pressure (one atmosphere) is preferably 50° C. or higher and more preferably 70° C. or higher. The upper limit is preferably 250° C. or lower and more preferably 220° C. or lower. The dispersion media may be used singly or two or more dispersion media may be used in combination.

<Method for Estimating Clog P Value>

The Clog P value refers to a value of the common logarithm log P of the partition coefficient P into 1-octanol and water obtained by means of calculation. Regarding methods or software used for the calculation of the Clog P value, well-known methods and software can be used; however, unless particularly otherwise described, in the present invention, structures are drawn and computed using ChemDraw manufactured by Perkin Elmer, Inc.

(Supporting Electrolytes [Lithium Salts or the Like])

The present invention may further include a supporting electrolyte. The supporting electrolyte (lithium salt or the like) that can be used in the present invention is preferably a lithium salt that is generally used in this kind of products and is not particularly limited, and examples of preferred supporting electrolytes include the following electrolytes.

(L-1) Inorganic lithium salts: Inorganic fluoride salts such as $LiPF_6$, $LiBF_4$, $LiAsF_6$, and $LiSbF_6$; perhalogen acids such as $LiClO_4$, $LiBrO_4$, and $LiIO_4$; inorganic chloride salts such as $LiAlCl_4$ (L-2) Fluorine-containing organic lithium salts: Perfluoroalkanesulfonate salts such as $LiCF_3SO_3$; perfluoroalkanesulfonylimide salts such as $LiN(CF_3SO_2)_2$, $LiN(CF_3CF_2SO_2)_2$, $LiN(FSO_2)_2$, $LiN(CF_3SO_2)(C_4F_9SO_2)$; perfluoroalkanesulfonyl methide salts such as $LiC(CF_3SO_2)_3$; fluoroalkyl fluorophosphates salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$ (L-3) Oxalate borate salts: Lithium bis(oxalato)borate, lithium difluorooxalatoborate, and the like Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)$ are preferred, and lithium imide salts such as $LiPF_6$, $LiBF_4$, $LiN(Rf^1SO_2)_2$, $LiN(FSO_2)_2$, and $LiN(Rf^1SO_2)(Rf^2SO_2)$ are more preferred. Here, $Rf^1$ and $Rf^2$ each independently represent a perfluoroalkyl group.

Meanwhile, electrolytes being used in electrolytic solutions may be used singly or two or more electrolytes may be arbitrarily combined together.

The content of the lithium salt is preferably more than 0.1 parts by mass and more preferably 0.5 parts by mass or more with respect to 100 parts by mass of the solid electrolyte. The upper limit is preferably 10 parts by mass or less and more preferably 5 parts by mass or less.

(Positive Electrode Active Material)

To the solid electrolyte composition of the present invention, an active material (electrode active material) is added, and a positive electrode active material is preferably added. Therefore, the solid electrolyte composition can be used as, particularly, a composition for positive electrode materials. As the positive electrode active material, transition metal oxides are preferably used, and, among these, the positive electrode active material preferably has transition metals $M^a$ (one or more elements selected from Co, Ni, Fe, Mn, Cu, and V). In addition, mixing elements $M^b$ (metal elements belonging to Group I (Ia) of the periodic table other than lithium, elements belonging to Group II (IIa), Al, Ga, In, Ge, Sn, Pb, Sb, Bi, Si, P, B, and the like) may be mixed into the positive electrode active material. When the solid electrolyte composition includes a transition metal oxide, the affinity to dispersion media deteriorates, and thus it is possible to accelerate the precipitation of the active materials, which is preferable. Examples of the transition metal oxides include specific transition metal oxides including transition metal oxides represented by any one of General Formulae (MA) to (MC) below and additionally include $V_2O_5$, $MnO_2$, and the like.

As the positive electrode active material, a particulate positive electrode active material may be used. Specifically, transition metal oxides capable of reversibly intercalating and deintercalating lithium ions can be used, and the specific transition metal oxides described above are preferably used.

Preferred examples of the transition metal oxides include oxides including the transition element $M^a$ and the like. At this time, the mixing elements $M^b$ (preferably Al) may be mixed into the positive electrode active material. The amount mixed is preferably 0 to 30 mol % with respect to the amount of the transition metal. Transition metal oxides synthesized by mixing Li and the transition metal so that the molar ratio of Li/$M^a$ reaches 0.3 to 2.2 are more preferred.

[Transition Metal Oxide Represented by General Formula (MA) (Bedded Salt-Type Structure)]

As lithium-containing transition metal oxides, among them, transition metal oxides represented by General Formula (MA) are preferred.

$Li_aM^1O_b$ Formula (MA)

In the formula, $M^1$ is the same as $M^a$. a represents 0 to 1.2 (preferably 0.2 to 1.2) and is preferably 0.6 to 1.1. b represents 1 to 3 and is preferably 2. A part of $M^1$ may be substituted with the mixing element $M^b$. The transition metal oxides represented by General Formula (MA) typically have a bedded salt-type structure.

The present transition metal oxides represented by Formula (MA) are more preferably transition metal oxides represented by individual general formulae described below.

$Li_gCoO_k$ (MA-1)

$Li_gNiO_k$ (MA-2)

$Li_gMnO_k$ (MA-3)

$Li_gCo_jNi_{1-j}O_k$ (MA-4)

$Li_gNi_jMn_{1-j}O_k$ (MA-5)

$Li_gCo_jNi_iAl_{1-j-i}O_k$ (MA-6)

$Li_gCo_jNi_iMn_{1-j-i}O_k$ (MA-7)

Here, g is the same as a. j represents 0.1 to 0.9. i represents 0 to 1. However, 1-j-i reaches 0 or more. k is the same as b. Specific examples of the transition metal oxides include $LiCoO_2$ (lithium cobalt oxide, hereinafter, also referred to as [LCO]), $LiNiO_2$ (lithium nickelate), $LiNi_{0.85}Co_{0.1}Al_{0.05}O_2$ (lithium nickel cobalt aluminum oxide, hereinafter, also referred to as [NCA]), $Li(Ni_{1/3}Co_{1/3}Mn_{1/3})O_2$ (lithium nickel manganese cobalt oxide, hereinafter, also referred to as [NMC]), and $LiNi_{0.5}Mn_{0.5}O_2$ (lithium manganese nickelate).

Although there is partial duplication in expression, preferred examples of the transition metal oxides represented by General Formula (MA) include transition metal oxides represented by the following formulae when expressed in a different manner.

$Li_gNi_xMn_yCo_zO_2$(x>0.2, y>0.2, z≥0, x+y+z=1) (i)

Typical transition metal oxides:

$Li_gNi_{1/3}Mn_{1/3}Co_{1/3}O_2$ $Li_gNi_{1/2}Mn_{1/2}O_2$ $Li_gNi_xCo_yAl_zO_2$ (x>0.7, y>0.1, 0.1>z≥1.05, x+y+z=1) (ii)

Typical transition metal oxides:

$Li_gNi_{0.8}Co_{0.15}Al_{0.05}O_2$

[Transition Metal Oxide Represented by General Formula (mb) (Spinel-Type Structure)]

As lithium-containing transition metal oxides, among them, transition metal oxides represented by General Formula (MB) below are also preferred.

$Li_cM^{22}O_d$ (MB)

In the formula, $M^2$ is the same as $M^a$. c represents 0 to 2 (0.2 to 2) and is preferably 0.6 to 1.5. d represents 3 to 5 and is preferably 4.

The transition metal oxides represented by General Formula (MB) are more preferably transition metal oxides represented by individual formulae described below.

$Li_mMn_2O_n$ (MB-1)

$Li_mMn_pAl_{2-p}O_n$ (MB-2)

$Li_mMn_pNi_{2-p}O_n$ (MB-3)

m is the same as c. n is the same as d. p represents 0 to 2. Specific examples of the transition metal oxides include $LiMn_2O_4$, $LiMn_{1.5}Ni_{0.5}O_4$.

Preferred examples of the transition metal oxides represented by General Formula (MB) further include transition metal oxides represented by the following formulae.

$LiCoMnO_4$ (a)

$Li_2FeMn_3O_8$ (b)

$Li_2CuMn_3O_8$ (c)

$Li_2CrMn_3O_8$ (d)

$Li_2NiMn_3O_8$ (e)

From the viewpoint of a high capacity and a high output, among the above-described transition metal oxides, electrodes including Ni are still more preferred.

[Transition Metal Oxide Represented by General Formula (MC)]

As lithium-containing transition metal oxides, lithium-containing transition metal phosphorus oxides are preferably used, and, among these, transition metal oxides represented by General Formula (MC) below are also preferred.

$Li_eM^3(PO_4)_f$ (MC)

In the formula, e represents 0 to 2 (preferably 0.2 to 2) and is preferably 0.5 to 1.5. f represents 1 to 5 and is preferably 0.5 to 2.

$M^3$ represents one or more elements selected from V, Ti, Cr, Mn, Fe, Co, Ni, and Cu. $M^3$ may be substituted with not only the mixing element $M^b$ but also other metal such as Ti, Cr, Zn, Zr, or Nb. Specific examples include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, monoclinic nasicon-type vanadium phosphate salt such as $Li_3V2(PO_4)_3$ (lithium vanadium phosphate).

Meanwhile, the a, c, g, m, and e values representing the composition of Li are values that change due to charging and discharging and are, typically, evaluated as values in a stable state when Li is contained. In General Formulae (a) to (e), the composition of Li is expressed using specific values, but these values also change due to the operation of batteries.

The average particle diameter of the positive electrode active material being used in the present invention is not particularly limited, but is preferably 0.1 μm to 50 μm. In order to provide a predetermined particle diameter to the positive electrode active material, an ordinary crusher or classifier may be used. Positive electrode active materials obtained using a firing method may be used after being washed with water, an acidic aqueous solution, an alkaline aqueous solution, or an organic solvent. The method for measuring the average particle diameter of the positive electrode active material particles is based on the method for measuring the average particle diameter of inorganic particles described in the section of examples described below.

The concentration of the positive electrode active material is not particularly limited. Meanwhile, the concentration in the solid electrolyte composition is preferably 20 to 90% by mass and more preferably 40 to 80% by mass with respect to 100% by mass of the solid content.

(Negative Electrode Active Material)

To the solid electrolyte composition of the present invention, an active material (electrode active material) is added, and a negative electrode active material may be added. In such a case, the solid electrolyte composition can be used as a composition for negative electrode materials. As the negative electrode active material, negative electrode active materials capable of reversibly intercalating and deintercalating lithium ions are preferred. These materials are not particularly limited, and examples thereof include carbonaceous materials, metal oxides such as tin oxide and silicon oxide, metal complex oxides, a lithium single body or lithium alloys such as lithium aluminum alloys, metals capable of forming alloys with lithium such as Sn, Si and In, and the like. These materials may be used singly or two or more materials may be jointly used in an arbitrary combination and fractions. Among these, carbonaceous materials or lithium complex oxides are preferably used in terms of reliability. In addition, the metal complex oxides are preferably capable of absorbing and emitting lithium. The materials are not particularly limited, but preferably contain titanium and/or lithium as a constituent component from the viewpoint of high-current density charging and discharging characteristics.

The carbonaceous materials being used as the negative electrode active material are materials substantially made of carbon. Examples thereof include petroleum pitch, natural graphite, artificial graphite such as highly oriented pyrolytic graphite, and carbonaceous material obtained by firing a variety of synthetic resins such as PAN-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated PVA-based carbon fibers, lignin carbon fibers, glassy carbon fibers, and active carbon fibers, mesophase microspheres, graphite whisker, flat graphite, and the like.

These carbonaceous materials can also be classified into non-graphitizable carbon materials and graphite-based carbon materials depending on the degree of graphitization. In addition, the carbonaceous materials preferably have the surface separation, the density, and the sizes of crystallites described in JP1987-22066A (JP-S62-22066A), JP1990-6856A (JP-H02-6856A), and JP1991-45473A (JP-H03-45473A). The carbonaceous materials do not need to be a sole material, and it is also possible to use the mixtures of a natural graphite and a synthetic graphite described in JP1993-90844A (JP-H05-90844A), the graphite having a coated layer described in JP1994-4516A (JP-H06-4516A), and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which Cuba rays are used and may have crystalline diffraction lines. The highest intensity in the crystalline diffraction line appearing at the 2θ value of 40° or more and 70° or less is preferably 100 times or less and more preferably five times or less of the diffraction line intensity at the peak of the broad scattering line appearing at the 2θ value of 20° or more and 40° or less and particularly preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides made of one element or a combination of two or more elements of Al, Ga, Si, Sn, Ge, Pb, Sb, and Bi, and chalcogenides are particularly preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, $SnSiS_3$, and the like. In addition, these amorphous oxides may be complex oxides with lithium oxide, for example, $Li_2SnO_2$.

The average particle diameter of the negative electrode active material is preferably 0.1 μm to 60 μm. In order to provide a predetermined particle diameter, a well-known crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind powder classifier, or the like depending on the necessity. Both of dry-type classification and wet-type classification can be carried out. The method for measuring the average particle diameter of the negative electrode active material particles is based on the method for measuring the average particle diameter of the inorganic particles described in the section of examples described below.

The chemical formula of the compound obtained using the firing method can be computed using inductively coupled plasma (ICP) emission spectrometry as the measurement method or from the mass difference of powder before and after firing as a convenient method.

Preferred examples of negative electrode active materials that can be jointly used in the amorphous oxide negative electrode active material mainly containing Sn, Si, or Ge include carbon materials capable of absorbing and emitting lithium ions or lithium metals, lithium, lithium alloys, and metals capable of forming alloys with lithium.

The negative electrode active material preferably contains titanium atoms. More specifically, $Li_4Ti_5O_{12}$ is preferred since the volume fluctuation during the absorption and emission of lithium ions is small and thus the high-speed charging and discharging characteristics are excellent and the deterioration of electrodes is suppressed, whereby it becomes possible to improve the service lives of lithium ion secondary batteries. When a specific negative electrode and, furthermore, a specific electrolytic solution are combined together, the stability of secondary batteries improves under a variety of operation conditions.

In the present invention, it is also preferable to apply Si-based negative electrodes. Generally, Si negative electrodes are capable of absorbing a larger number of Li ions than current carbon negative electrodes (graphite, acetylene black, and the like). That is, since the amount of Li ions absorbed per weight increases, it is possible to increase battery capacities. As a result, there is an advantage of becoming capable of elongating the battery-operating time.

The concentration of the negative electrode active material is not particularly limited, but is preferably 10 to 90% by mass and more preferably 20 to 80% by mass with respect to 100% by mass of the solid content in the solid electrolyte composition.

Meanwhile, in the above-described embodiment, an example in which the positive electrode active material or the negative electrode active material is added to the solid electrolyte composition according to the present invention has been described, but the present invention is not interpreted to be limited thereto. For example, paste including a solid electrolyte may be prepared using an ordinary binder. However, in the present invention, it is preferable to use a combination of the solid electrolyte composition and a positive electrode active material. In addition, to the active material layers in the positive electrode and the negative electrode, a conduction aid may be appropriately added as necessary. As an ordinary conduction aid, it is possible to add graphite, carbon black, acetylene black, Ketjenblack, a carbon fiber, metal powder, a metal fiber, a polyphenylene derivative, or the like as an electron-conducting material.

<Collector (Metal Foil)>

As the collector of the positive or negative electrode, an electron conductor that does not chemically change is preferably used. The collector of the positive electrode is preferably a collector obtained by treating the surface of aluminum or stainless steel with carbon, nickel, titanium, or silver in addition to aluminum, stainless steel, nickel, titanium, or the like, and, among these, aluminum and aluminum alloys are more preferred. The collector of the negative electrode is preferably aluminum, copper, stainless steel, nickel, or titanium and more preferably aluminum, copper, or a copper alloy.

Regarding the shape of the collector, generally, collectors having a film sheet-like shape are used, but it is also possible to use nets, punched collectors, porous bodies, porous bodies, foams, compacts of fiber groups, and the like. The thickness of the collector is not particularly limited, but is preferably 1μm to 500 μm. In addition, the surface of the collector is preferably provided with protrusions and recesses by means of a surface treatment.

<Production of All Solid State Secondary Battery>

The all solid state secondary battery may be produced using an ordinary method. Specific examples thereof include a method in which the solid electrolyte composition is applied onto a metal foil that serves as the collector and an electrode sheet for a battery on which a coated film is formed is produced. For example, a composition serving as a positive electrode material is applied onto a metal foil which is the positive electrode layer and then dried, thereby forming a positive electrode layer. At this time, according to the precipitation method which is a preferred embodiment of the present invention, it is possible to form a solid electrolyte layer as the surface layer. Alternatively, next, a solid electrolyte layer may be formed by applying and then drying the solid electrolyte composition onto a positive electrode sheet for a battery. Furthermore, a composition serving as a negative electrode material is applied and dried thereon, thereby forming a negative electrode layer. A collector (metal foil) for the negative electrode is overlaid thereon, whereby it is possible to obtain a structure of the all solid state secondary battery in which the solid electrolyte layer is sandwiched between the positive electrode layer and the negative electrode layer. Meanwhile, the respective compositions described above may be applied using an ordinary method. At this time, after the application of each of the composition forming the positive electrode active material layer, the composition forming the inorganic solid electrolyte layer (the solid electrolyte composition), and the composition forming the negative electrode active material layer, a heating treatment may be carried out or a heating treatment may be carried out after the application of multiple layers. The heating temperature is not particularly limited, but is preferably 30° C. or higher, more preferably 60° C. or higher, still more preferably 80° C. or higher, and particularly preferably 100° C. or higher. The upper limit is preferably 300° C. or lower, more preferably 250° C. or lower, still more preferably 200° C. or lower, and particularly preferably 150° C. or lower. When the compositions are heated in the above-described temperature range, it is possible to remove the dispersion medium and cause the compositions to fall into a solid state. In addition, the temperature is not excessively increased, and individual dissociated members are not damaged, which is preferable. Therefore, in all solid state secondary batteries, excellent general performance is exhibited, and favorable bonding properties and favorable ion conductivity can be obtained.

<Applications of All Solid State Secondary Battery>

The all solid state secondary battery of the present invention can be applied to a variety of applications. Application aspects are not particularly limited, and, in the case of being mounted in electronic devices, examples thereof include notebook computers, pen-input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, backup power supplies, and the like. Additionally, examples of consumer applications include automobiles, electric vehicles, motors, lighting equipment, toys, game devices, road conditioners, watches, strobes, cameras, medical devices (pacemakers, hearing aids, shoulder massage devices, and the like), and the like. Furthermore, the all solid state secondary battery can be used for a variety of military applications and universe applications. In addition, the all solid state secondary battery can also be combined with solar batteries.

Among these, the all solid state secondary battery is preferably applied to applications for which a high capacity and high rate discharging characteristics are required. For example, in electricity storage facilities expected to have a high capacity in the future, high reliability becomes essential, and furthermore, the satisfaction of battery performance is required. In addition, high-capacity secondary batteries are mounted in electric vehicles and the like and are assumed to be used in domestic applications in which charging is carried out every day, and thus better reliability for overcharging is required. According to the present invention, it is possible to preferably cope with the above-described application aspects and exhibit excellent effects.

According to the preferred embodiment of the present invention, individual application aspects as described below are derived.

(1) Solid electrolyte compositions including active materials capable of intercalating and deintercalating ions of metals belonging to Group I or II of the periodic table (electrode compositions for positive electrodes and negative electrodes).

(2) Electrode sheets for a battery in which a film of the solid electrolyte composition is formed on a metal foil (3) All solid state secondary batteries equipped with a positive electrode active material layer, a negative electrode active material layer, and a solid electrolyte layer in which at least any of the positive electrode active material layer, the negative electrode active material layer, or the solid electrolyte layer are layers constituted of the solid electrolyte composition (4) Methods for manufacturing electrode sheets for a battery in which the solid electrolyte composition is supplied onto a collector, an active material is eccentrically located in the bottom collector so as to form a gradient structure, and a film thereof is formed During this production of films, the binder polymer is crosslinked by heating through the action of the crosslinking agent or the crosslinking accelerator.

(5) Methods for manufacturing an all solid state secondary battery in which all solid state secondary batteries are manufactured through the method for manufacturing an electrode sheet for a battery.

All solid state secondary batteries refer to secondary batteries in which the positive electrode, the negative electrode, and the electrolyte are all constituted of solid. In other words, all solid state secondary batteries are differentiated from electrolytic solution-type secondary batteries in which a carbonate-based solvent is used as the electrolyte. Among these, the present invention is assumed to be an inorganic all solid state secondary battery. All solid state secondary batteries are classified into organic (high-molecular-weight) all solid state secondary batteries in which a high-molecular-weight compound such as polyethylene oxide is used as the electrolyte and inorganic all solid state secondary batteries in which Li—P—S, LLT, LLZ, or the like is used. Meanwhile, the application of high-molecular-weight compounds to inorganic all solid state secondary batteries is not inhibited, and high-molecular-weight compounds can be applied as the positive electrode active material, the negative electrode active material, and the binder of the inorganic solid electrolyte particles.

Inorganic solid electrolytes are differentiated from electrolytes in which the above-described high-molecular-weight compound is used as an ion conductive medium (high-molecular-weight electrolyte), and inorganic compounds serve as ion conductive media. Specific examples thereof include Li—P—S, LLT, and LLZ. Inorganic solid electrolytes do not emit positive ions (Li ions) and exhibit an ion transportation function. In contrast, there are cases in which materials serving as an ion supply source which is added to electrolytic solutions or solid electrolyte layers and emits positive ions (Li ions) are referred to as electrolytes; however, when differentiated from electrolytes as the ion transportation materials, the materials are referred to as "electrolyte salts" or "supporting electrolytes". Examples of the electrolyte salts include lithium bistrifluoromethanesulfonylimide (LiTFSI).

In the present invention, "compositions" refer to mixtures obtained by uniformly mixing two or more components. However, compositions may partially include aggregation or uneven distribution as long as the compositions substantially maintain uniformity and exhibit desired effects.

The solid electrolyte composition refers to a composition including an electrode active material, that is, the scope thereof includes electrode material compositions (positive electrode material compositions and negative electrode material compositions).

EXAMPLES

Hereinafter, the present invention will be described in more detail on the basis of examples, but the present invention is not interpreted to be limited thereto. Meanwhile, unless particularly otherwise described, fractions described in the present examples is mass-based.

Example 1 and Comparative Example 1

(Synthesis Example of High-Molecular-Weight Compound)

(1) Synthesis of Polymer B-1

To a 1 L three-neck flask equipped with a reflux cooling tube and a gas introduction cock, a 43% by mass heptane solution of Macromonomer M-1 (47 parts by mass) and heptane (60 parts by mass) were added, nitrogen gas was introduced thereinto for ten minutes at a flow rate of 200 mL/min, and then the components were heated to 80° C. A liquid prepared in another container (a liquid obtained by mixing a 43% by mass heptane solution of Macromonomer M-1 (93 parts by mass), methyl acrylate [A-1] (manufactured by Wako Pure Chemical Industrial Ltd.) (100 parts by mass), methyl methacrylate [A-2] (manufactured by Wako Pure Chemical Industrial Ltd.) (20 parts by mass), acrylic acid [a-101] (manufactured by Wako Pure Chemical Industrial Ltd.) (20 parts by mass), and a polymerization initiator (trade name: V-601 (manufactured by Wako Pure Chemical Industrial Ltd.) (1.1 parts by mass)) was added dropwise thereto for two hours, and then the components were stirred at 80° C. for two hours. After that, V-601 (0.2 g) was added thereto, and furthermore, the components were stirred at 95° C. for two hours. After the mixture was cooled to room temperature, heptane (300 ml) was added thereto, and filtration was carried out, thereby obtaining a dispersion liquid of Polymer B-1. The solid content concentration of Polymer B-1 was 30.2%, the volume-average particle diameter was 220 nm, and the weight-average molecular weight was 93,000.

Dispersion liquids of Binder Particles B-2 to BP-11 were respectively prepared in the same manner as in the preparation of the dispersion liquid of Binder Polymer B-1 except for the fact that compositions shown in Table 1 below were produced.

TABLE 1

| No. | M1 | (%) | M2 | (%) | a | (%) | MM | (%) | Volume-average particle diameter (nm) | Weight-average molecular amount |
|---|---|---|---|---|---|---|---|---|---|---|
| B-1 | A-1 | 50 | A-2 | 10 | a-101 | 10 | M-1 | 30 | 220 | 93,000 |
| B-2 | A-1 | 57 | A-2 | 11 | a-101 | 2 | M-1 | 30 | 242 | 89,000 |
| B-3 | A-3 | 50 | A-2 | 10 | a-101 | 10 | M-1 | 30 | 246 | 85,000 |

TABLE 1-continued

| | M1 | | M2 | | a | | MM | | Volume-average particle diameter | Weight-average molecular |
|---|---|---|---|---|---|---|---|---|---|---|
| No. | | (%) | | (%) | | (%) | | (%) | (nm) | amount |
| B-4 | A-6 | 50 | A-2 | 10 | a-101 | 10 | M-1 | 30 | 192 | 99,000 |
| B-5 | A-11 | 50 | A-2 | 10 | a-101 | 10 | M-1 | 30 | 289 | 87,000 |
| B-6 | A-6 | 50 | A-2 | 10 | a-117 | 10 | M-1 | 30 | 198 | 88,000 |
| B-7 | A-6 | 50 | A-30 | 10 | a-101 | 10 | M-1 | 30 | 206 | 89,000 |
| B-8 | A-13 | 50 | A-2 | 10 | a-101 | 10 | M-1 | 30 | 292 | 92,000 |
| B-9 | A-6 | 50 | A-2 | 10 | a-101 | 10 | M-4 | 30 | 279 | 95,000 |
| B-10 | A-6 | 50 | A-2 | 10 | a-101 | 10 | M-5 | 30 | 286 | 84,000 |
| B-11 | A-6 | 60 | A-10 | 10 | — | — | M-1 | 30 | 233 | 91,000 |

"%" in the table indicates "% by mass" and corresponds to copolymerization fractions.

Regarding the numbers of compounds, the exemplary compounds are referred to.

M1: Monomer constituting a repeating unit (1)

M2: Monomer constituting a repeating unit (2)

MM: Macromonomer a: Acidic functional group-containing monomer

<Synthesis Example of Macromonomer M-1>

To a 1 L three-neck flask equipped with a reflux cooling tube and a gas introduction cock, toluene (190 parts by mass) was added, nitrogen gas was introduced thereinto for ten minutes at a flow rate of 200 mL/min, and then the components were heated to 80° C. A liquid prepared in another container was added dropwise thereto for two hours, and then the components were stirred at 80° C. for two hours. After that, V-601 (0.2 g) was added thereto, and furthermore, the components were stirred at 95° C. for two hours. After the stirring, 2,2,6,6-tetramethylpiperidine-1-oxyl (manufactured by Tokyo Chemical Industry Co., Ltd.) (0.025 parts by mass), glycidyl methacrylate (manufactured by Wako Pure Chemical Industrial Ltd.) (13 parts by mass), and tetrabutylammonium bromide (manufactured by Tokyo Chemical Industry Co., Ltd.) (2.5 parts by mass) were added to a solution held at 95° C. after being stirred and stirred in the atmosphere at 120° C. for three hours. The mixture was cooled to room temperature, precipitation was caused by adding methanol thereto, the precipitate was washed twice with methanol and then dried by blowing the air at 50° C. The obtained solid was dissolved in heptane (300 parts by mass), thereby obtaining a solution of Macromonomer M-1. The solid content concentration was 43.4%, the SP value was 9.1, and the weight-average molecular weight was 16,000.

(Formulation α)

Dodecyl methacrylate MM-2 (manufactured by Wako Pure Chemical Industrial Ltd.) 150 parts by mass Methyl methacrylate A-2 (manufactured by Wako Pure Chemical Industrial Ltd.) 59 parts by mass 3-Mercaptoisobutyric acid (manufactured by Tokyo Chemical Industry Co., Ltd.) 2 parts by mass V-601 (trade name, manufactured by Wako Pure Chemical Industrial Ltd.) 1.9 parts by mass Macromonomer M-1

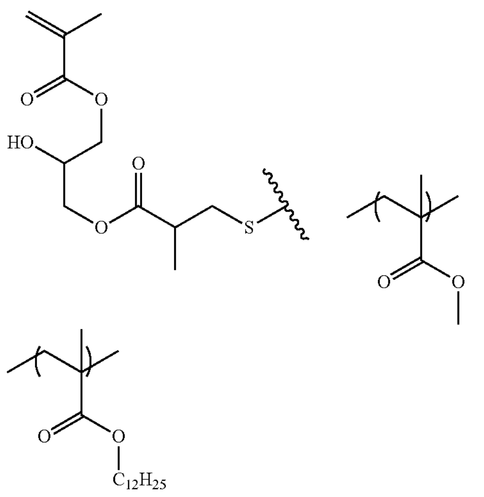

<Synthesis Example of Macromonomer M-2>

Glycidyl methacrylate (manufactured by Tokyo Chemical Industry Co., Ltd.) was reacted with a self-condensed body (GPC polystyrene standard weight-average molecular weight: 9,000) of 12-hydroxystearic acid (manufactured by Wako Pure Chemical Industrial Ltd.), thereby obtaining Macromonomer M-2. The ratio between 12-hydroxystearic acid and glycidyl methacrylate was set to 99:1 (molar ratio). The SP value of Macromonomer M-2 was 9.2, and the weight-average molecular weight was 9,000.

Macromonomer M-2

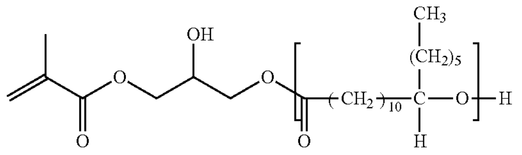

<Synthesis example of Macromonomer M-3>

4-Hydroxystrene (manufactured by Wako Pure Chemical Industrial Ltd.) was reacted with a self-condensed body (GPC polystyrene standard weight-average molecular weight: 2,000) of 12-hydroxystearic acid (manufactured by Wako Pure Chemical Industrial Ltd.), thereby obtaining Macromonomer M-3. The ratio between 12-hydroxystearic acid and 4-Hydroxystrene was set to 99:1 (molar ratio). The SP value of Macromonomer M-3 was 9.2, and the weight-average molecular weight was 2,100.

Macromonomer M-3

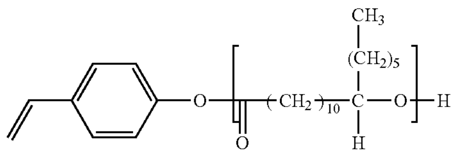

<Macromonomer M-4>

One terminal methacryloylated poly-n-butylacrylate oligomer (Mw=13,000, trade name: AB-6, manufactured by Toagosei Co., Ltd.) was used as Macromonomer M-4. The SP value of Macromonomer M-4 was 9.1.

<Synthesis example of Macromonomer M-5>

To a 1 L three-neck flask equipped with a reflux cooling tube and a gas introduction cock, toluene (190 parts by mass) was added, nitrogen gas was introduced thereinto for ten minutes at a flow rate of 200 mL/min, and then the components were heated to 80° C. A liquid prepared in another container (Formulation β) was added dropwise thereto for two hours, and then the components were stirred at 80° C. for two hours. After that, V-601 (0.2 g) was added thereto, and furthermore, the components were stirred at 95° C. for two hours. After the stirring, 2,2,6,6-tetramethylpiperidine 1-oxyl (manufactured by Tokyo Chemical Industry Co., Ltd.) (0.025 parts by mass), glycidyl methacrylate (manufactured by Wako Pure Chemical Industrial Ltd.) (13 parts by mass), and tetrabutylammonium bromide (manufactured by Tokyo Chemical Industry Co., Ltd.) (2.5 parts by mass) were added to a solution held at 95° C. after being stirred and stirred in the atmosphere at 120° C. for three hours. The mixture was cooled to room temperature, precipitation was caused by adding methanol thereto, the precipitate was washed twice with methanol and then dried by blowing the air at 50° C. The obtained solid was dissolved in heptane (300 parts by mass), thereby obtaining a solution of Macromonomer M-5. The solid content concentration was 38.1%, and the weight-average molecular weight was 3,500.

(Formulation β)

Dodecyl methacrylate MM-2 (manufactured by Wako Pure Chemical Industrial Ltd.) 150 parts by mass Methyl methacrylate A-2 (manufactured by Wako Pure Chemical Industrial Ltd.) 59 parts by mass Acrylic acid a-101 (manufactured by Wako Pure Chemical Industrial Ltd.) 2 parts by mass V-601 (trade name, manufactured by Wako Pure Chemical Industrial Ltd.) 5 parts by mass Macromonomer M-5

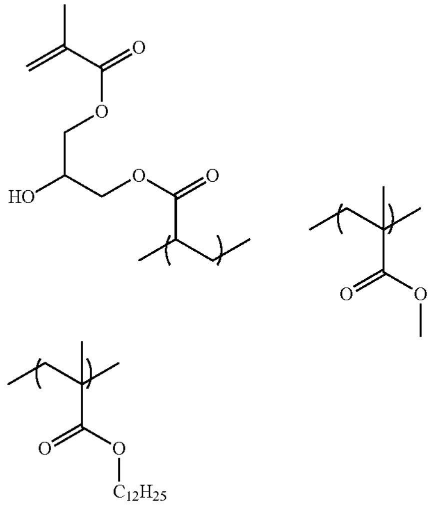

Preparation Composition for Secondary Battery Positive Electrode

Preparation of Composition for Positive Electrode (U-1)

180 zirconia beads having a diameter of 5 mm were injected into a 45 mL zirconia container (manufactured by Fritsch Japan Co., Ltd.), Li/P/S (2.7 g), a polymer (B-1) (0.3 g in terms of the solid content), and heptane (22 g) as a dispersion medium were injected thereinto. After that, the container was set in a planetary ball mill P-7 (trade name) manufactured by Fritsch Japan Co., Ltd., and the components were stirred at 25° C. and a rotation speed of 300 rpm for two hours. After that, NMC (Nippon Chemical Industrial Co., Ltd.) (7.0 g) was injected thereinto as an active material, similarly, the container was set in a planetary ball mill P-7, and the components were stirred at 25° C. and a rotation speed of 100 rpm for 15 minutes, thereby obtaining a composition for a positive electrode (U-1).

Preparation of Compositions for Positive Electrode (U-2) to (U-18) and (V-1) to (V-3)

Compositions for a positive electrode (U-2) to (U-18) and (V-1) to (V-3) were adjusted using the same method as above except for the fact that materials were changed as shown in Table 2.

TABLE 2

| Composition | Positive electrode active material | % | Solid electrolyte | % | Polymer | % | Dispersion medium |
|---|---|---|---|---|---|---|---|
| U-1 | NMC | 70% | Li/P/S | 27% | B-1 | 3% | Heptane |
| U-2 | NMC | 70% | Li/P/S | 27% | B-2 | 3% | Heptane |
| U-3 | NMC | 70% | Li/P/S | 27% | B-3 | 3% | Heptane |
| U-4 | LCO | 70% | Li/P/S | 27% | B-3 | 3% | Heptane |
| U-5 | NMC | 70% | Li/P/S | 27% | B-3 | 3% | Dibutyl ether |
| U-6 | NMC | 70% | Li/P/S | 27% | B-4 | 3% | Heptane |
| U-7 | NMC | 70% | Li/P/S | 27% | B-5 | 3% | Heptane |
| U-8 | NMC | 70% | Li/P/S | 27% | B-6 | 3% | Heptane |
| U-9 | NMC | 70% | Li/P/S | 27% | B-7 | 3% | Heptane |
| U-10 | NMC | 70% | Li/P/S | 27% | B-8 | 3% | Heptane |
| U-11 | NMC | 70% | Li/P/S | 27% | B-9 | 3% | Heptane |
| U-12 | NMC | 70% | Li/P/S | 27% | B-10 | 3% | Heptane |
| U-13 | NMC | 70% | Li/P/S | 27% | M1913 | 3% | Heptane |
| U-14 | NMC | 70% | LLZ | 27% | B-1 | 3% | Heptane |
| U-15 | NMC | 70% | Li/P/S | 29% | B-3 | 1% | Heptane |
| U-16 | NMC | 70% | Li/P/S | 29.5% | B-3 | 0.5% | Heptane |
| U-17 | NMC | 70% | Li/P/S | 27% | B-11 | 3% | Heptane |
| U-18 | NMC | 70% | Li/P/S | 27% | B-12 | 3% | Dibutyl ether |
| V-1 | NMC | 70% | Li/P/S | 27% | BC-1 | 3% | Toluene |
| V-2 | NMC | 70% | Li/P/S | 30% | — | — | Heptane |
| V-3 | NMC | 70% | Li/P/S | 27% | HSBR | 3% | Heptane |

<Note in the Table>

The units of numerical values in the table are 'parts by mass'.

M1913: TUFTEC M1913 manufactured by Asahi Kasei Corporation (carboxylic acid-modified hydrogenated styrene butadiene rubber)

HSBR: Hydrogenated styrene-butadiene rubber

B-12: Urethane Polymer Obtained Using the Following Method 1,4-Butanediol (manufactured by Wako Pure Chemical Industries, Ltd.) (3.2 g), 2,2-bis(hydroxymethyl) propionic acid (manufactured by Tokyo Chemical Industry Co., Ltd.) (0.5 g), and dimethyl formamide (45 g) were added to a 200 mL three-neck flask, heated and dissolved at 50° C. Dicyclohexylmethane diisocyanate (manufactured by Tokyo Chemical Industry Co., Ltd.) (10.0 g) was added thereto while heating and dissolving the components at 50° C. and then heated and stirred at 80° C. After ten minutes from the heating of the components to 80° C., a bismuth polymerization catalyst NEOSTAN U-600 (trade name, manufactured by Nittoh Chemical Co., Ltd.) (0.2 g) was added thereto, and the mixture was continuously heated and stirred for eight hours. After that, the reaction solution was added to methanol (2 mL), and re-precipitation of the polymer was carried out. The obtained powder was filtered and dried in a vacuum at 80° C., thereby obtaining powder (11.8 g) of Polymer B-12.

The weight-average molecular weight of the obtained polymer was measured by means of GPC to be 58,500.

BC-1: Polymer Obtained Using the Following Method n-Butyl acrylate (700 parts by mass), styrene (200 parts by mass), methylmethacrylate (5 parts by mass), divinyl benzene (10 parts by mass), polyoxyethylene lauryl ether (manufactured by Kao Corporation, EMULGEN 108, non-ionic surfactant, the number of carbon atoms in an alkyl group was 12, HLB value: 12.1) (25 parts by mass) as an emulsifier, ion exchange water (1,500 parts by mass), and 2,2'-azobizisobutylonitrile (15 parts by mass) as a polymerization initiator were fed into an autoclave and sufficiently stirred. After that, the components were heated to 80° C., and polymerization was caused. In addition, after the initiation of polymerization, the components were cooled so as to stop the polymerization reaction, thereby obtaining latex of polymer particles.

Li/P/S: Sulfide Solid Electrolyte Synthesized Below

In a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed and injected into a mortar. Meanwhile, the molar ratio between $Li_2S$ and $P_2S_5$ was set to 75:25. The components were mixed together for five minutes in the agate mortar using an agate muddler.

Zirconia beads (66 g) having a diameter of 5 mm were injected into a 45 mL zirconia container (manufactured by Fritsch Japan Co., Ltd.), the full amount of the mixture was injected thereinto, and the container was completely sealed in an argon atmosphere. The container was set in a planetary ball mill P-7 manufactured by Fritsch Japan Co., Ltd., mechanical milling was carried out at 25° C. and a rotation speed of 510 rpm for 20 hours, thereby obtaining yellow powder (6.20 g) of a sulfide solid electrolyte material (Li/P/S glass).

Production of Positive Electrode Sheet for Secondary Battery

Each of the compositions for secondary battery positive electrode (U-1 and the like) obtained above was applied onto a 20 μm-thick aluminum foil using an applicator having an arbitrary clearance and left to stand for 15 minutes. This composition was heated at 80° C. for one hour, furthermore, heated at 120° C. for one hour, and a coating solvent was dried. After that, the composition was heated and pressurized using a heat press machine so as to obtain an arbitrary density, thereby obtaining a positive electrode sheet for a secondary battery (thickness: 80 μm).

Production of All Solid State Secondary Battery

Figure 3:
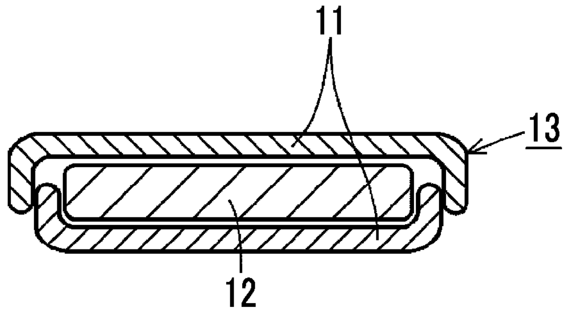
FIG. 3 is a side cross-sectional view schematically illustrating a testing device used in examples.

A disc-shaped piece having a diameter of 14 5 mm was cut out from the secondary battery electrode sheet obtained above, put into a 2032-type stainless steel coin case into which a spacer and a washer were combined, and an indium foil cut out into 15 mmφ was overlaid on the solid electrolyte (SE) layer. A stainless steel foil was further overlaid thereon, and the coin case was swaged, thereby producing an all solid state secondary battery (regarding the test specimen, refer to FIG. 3: reference sign 11 indicate a coin case, reference sign 12 indicates a solid electrolyte electrode sheet, and reference sign 13 indicates a coin battery).

TABLE 3

| No. | Positive electrode composition | $Vr_{D3}/Vr_{D1}$ | SE-SF | Bonding properties | IC | Note |
|---|---|---|---|---|---|---|
| 101 | U-1 | A | 4 | 4 | B | Invention Example |
| 102 | U-2 | B | 3 | 3 | B | Invention Example |
| 103 | U-3 | A | 4 | 5 | B | Invention Example |
| 104 | U-4 | A | 4 | 5 | B | Invention Example |
| 105 | U-5 | A | 4 | 5 | A | Invention Example |
| 106 | U-6 | A | 4 | 5 | B | Invention Example |
| 107 | U-7 | A | 4 | 5 | B | Invention Example |
| 108 | U-8 | A | 5 | 4 | B | Invention Example |
| 109 | U-9 | A | 4 | 5 | B | Invention Example |
| 110 | U-10 | A | 4 | 4 | B | Invention Example |
| 111 | U-11 | B | 3 | 4 | B | Invention Example |
| 112 | U-12 | B | 3 | 5 | B | Invention Example |
| 113 | U-13 | C | 2 | 4 | C | Invention Example |
| 114 | U-14 | B | 3 | 4 | E | Invention Example |
| 115 | U-15 | B | 3 | 4 | B | Invention Example |
| 116 | U-16 | C | 2 | 3 | B | Invention Example |
| 117 | U-17 | C | 2 | 4 | B | Invention Example |
| 118 | U-18 | B | 3 | 3 | B | Invention Example |
| c11 | V-1 | D | 1 | 2 | D | Comparative Example |
| c12 | V-7 | D | 1 | 1 | D | Comparative Example |
| c13 | V-3 | D | 1 | 3 | D | Comparative Example |

<Note in the Table>

SE-SF: The self-forming properties of the solid electrolyte (SE)

IC: Ion conductivity

<Method for Computing Gradient Ratio>

The electrode sheet for a secondary battery obtained above was cut using an Ar ion milling method. The cross-section was observed by means of SEM-EDX, and the cross-section of the electrode sheet was equally divided into three parts (designated as D1, D2, and D3 layers from the solid electrolyte layer) (refer to FIG. 2). Image processing was carried out on the divided parts, thereby obtaining the volume ratio Vr ($V_E/V_{SE}$) between the solid electrolyte and the active material in the respective layers, and the gradient ratio was obtained using the following calculation expression. The results are shown in Table 3.

A: $Vr_{D3}/Vr_{D1} \geq 2$

B: $2 > Vr_{D3}/Vr_{D1} \geq 1.5$

C: $1.5 > Vr_{D3}/Vr_{D1} \geq 1.2$

D: $1.2 > Vr_{D3}/Vr_{D1}$ $Vr_{D1}$ indicates the volume ratio Vr ($V_E/V_{SE}$) between the solid electrolyte and the active material in the D1 layer.

$Vr_{D3}$ indicates the volume ratio Vr ($V_E/V_{SE}$) between the solid electrolyte and the active material in the D3 layer <Evaluation of Self-forming Properties of Solid Electrolyte (SE) Layer (SE-SF)>

The cross-section of the electrode sheet for a secondary battery was observed using SEM, the thickness of the solid electrolyte (SE) layer was measured, and the SE layer self-forming properties were evaluated on the basis of the following evaluation standards. The results are shown in Table 3.

(Evaluation Standards)

5: 10 μm or more

4: 5 μm or more and less than 10 μm

3: 2 μm or more and less than 5 μm

2: 0 μm or more and less than 2 μm

1: SE layer is not formed.

<Evaluation of Bonding Properties>

A 12 mm-wide and 60 mm-long CELLOTAPE (registered trademark) (manufactured by Nichiban Co., Ltd.) piece was attached to the electrode sheet for a battery produced above and was peeled off 50 mm at a rate of 10 mm/min The bonding properties were evaluated using the ratio of the area of the peeled sheet portion to the area of the peeled CELLOTAPE (registered trademark) piece at this time. The measurement was carried out ten times, and the average value of eight measurement values excluding the maximum value and the minimum value was employed. Five samples for testing were used each level, the average value thereof was employed, and the bonding properties were evaluated on the basis of the following evaluation standards. The results are shown in Table 3.

(Evaluation Standards)

5: 0 or more and less than 5%

4: 5% or more and less than 15%

3: 15% or more and less than 30%

2: 30% or more and less than 60%

1: 60% or more

<Measurement of Ion Conductivity (IC)>

A test was carried out using the all solid state secondary battery obtained above. A 1255B FREQUENCY RESPONSE ANALYZER [trade name] manufactured by Solartron Metrology was used in a constant temperature vessel (30° C.). The alternating-current impedance was measured under conditions of a voltage amplitude of 5 mV and a frequency in a range of 1 MHz to 1 Hz. The resistance of the specimen in the film thickness direction was obtained by means of this measurement, and the ion conductivity was calculated and obtained from Expression (1) below.

$$\text{Ion conductivity(mS/cm)}=1000\times\text{specimen film thickness (cm)}/(\text{resistance}(\Omega)\times\text{specimen area (cm}^2))\quad\text{Expression (1)}$$

A: 0.15 mS/cm or more

B: 0.12 mS/cm or more and less than 0.15 mS/cm

C: 0.09 mS/cm or more and less than 0.12 mS/cm

D: 0.05 mS/cm or more and less than 0.09 mS/cm

E: Less than 0.05 mS/cm

For the secondary battery of Test 101, dVr of the electrode layer was measured according to the above-described method for measuring SE-SF. As a result, the value of dVr reached a maximum of 0.5.

Example 2

Individual macromonomers were synthesized by changing or subtracting the fraction of A-2 (Formulation α) introduced into Macromonomer M-1 or substituting part or all of A-2 with A-1 or A-30. A secondary battery was produced using these macromonomers instead of Macromonomer M-1 of Resin B-1, and tests were carried out in the same manner as Test 101. As a result, it was confirmed that, for all of the macromonomers, favorable performance was exhibited in the respective items described above.

Example 3

Macromonomers were synthesized using individual monomers described below instead of MM-2 (Formulation a) introduced into Macromonomer M-1. Secondary batteries were produced using these macromonomers or M-2 or M-3, and tests were carried out in the same manner as Test 101. As a result, it was confirmed that, for all of the macromonomers, favorable performance was exhibited in the respective items.

Meanwhile, n2 in Macromonomer MM-10 below represents 10≤n2≤200.

MM-1

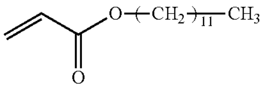

MM-2

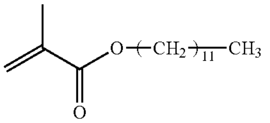

MM-3

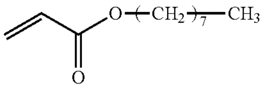

MM-4

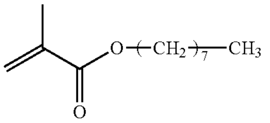

MM-5

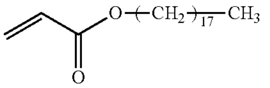

MM-6

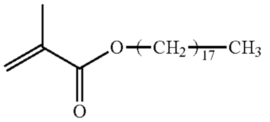

MM-7

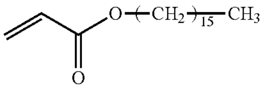

MM-8

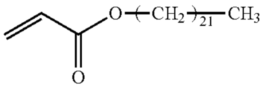

MM-9

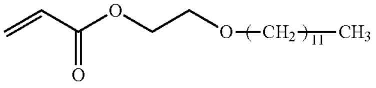

MM-10

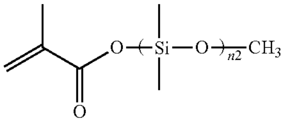

Example 4

Individual polymers were synthesized by substituting part or all of M2 (A-2) which was used as a monomer forming the main chain in the synthesis of Polymer B-1 with A-27, 29, 37, 52, 60 or 62. Secondary batteries were produced using these resins, and tests were carried out in the same manner as Test 101. As a result, it was confirmed that favorable performance was exhibited in the respective items described above.

Example 5

Individual polymers were synthesized in the same manner except for the fact that, in the conditions of Test 101, a-101 of Polymer B-1 was changed to a-104, 112, 115, and 116 respectively. Secondary batteries were produced using these resins, and tests were carried out in the same manner as Test 101. As a result, it was confirmed that favorable performance was exhibited in the respective items described above.

<Measurement of Particle Diameters>

(Measurement of Average Particle Diameter of Specific Polymer)

The average particle diameter of the polymer of the present invention was measured in the following order.

A dispersion liquid (1% by mass) of the resin prepared above was diluted and adjusted using an arbitrary solvent (the dispersion medium used in the preparation of the solid electrolyte composition; for example, in the case of Resin B-1, heptane) in a 20 mL sample bottle. The diluted dispersion liquid specimen was irradiated with 1 kHz ultrasonic waves for ten minutes and immediately used for tests. Data acquisition was carried out 50 times using this dispersion liquid specimen, a laser diffraction/scattering particle size analyzer LA-920 (manufactured by Horiba Ltd.), and a silica cell for measurement at a temperature of 25° C., and the obtained volume-average particle diameter was used as the average particle diameter. Regarding other detailed conditions, the description of JIS Z8828:2013 "Particle diameter analysis-dynamic light scattering method" was referred to as necessary. Five specimens were produced each level, and the average value thereof was employed.

The present invention has been described together with the embodiment; however, unless particularly specified, the present inventors do not intend to limit the present invention in any detailed portion of the description and consider that the present invention is supposed to be broadly interpreted within the concept and scope of the present invention described in the claims.

EXPLANATION OF REFERENCES

1: negative electrode collector
2: negative electrode active material layer (electrode layer)
3: solid electrolyte layer
4: positive electrode active material layer (electrode layer)
5: positive electrode collector
6: operation portion
10: all solid state secondary battery
11: coin case
12: sheet (solid electrolyte sheet or electrode sheet for secondary battery)
13: coin battery
40: electrode sheet for positive electrode
D1: upper layer
D2: intermediate layer
D3: lower layer
23: active material particles
24: inorganic solid electrolyte particles
S1: collector surface
S2: solid electrolyte layer surface

What is claimed is:

1. An all solid state secondary battery having a structure in which an electrode layer is located between a collector and an inorganic solid electrolyte layer, wherein the electrode layer contains an inorganic solid electrolyte having a conductivity of ions of metals belonging to Group I or II of the periodic table, an active material, and a specific polymer described below, wherein the specific polymer is selected from an acrylic resin and a urethane resin, and the acrylic resin and the urethane resin contains a repeating unit having an acidic functional group in a content of 5% by mass or more and 20% by mass or less in terms of the acidic equivalent, wherein, in the electrode layer, a volume ratio $V_E/V_{SE}$ of a total volume $V_E$ of the active material to a total volume $V_{SE}$ of the inorganic solid electrolyte is set to change from the collector through the inorganic solid electrolyte layer, and wherein a measured solid electrolyte layer comprises self-forming properties of 4 or 5 with respect to measured electrolyte thickness of 5 μm or more.

2. The all solid state secondary battery according to claim 1, wherein, in the electrode layer, the volume ratio $V_E/V_{SE}$ of the total volume $V_E$ of the active material to the total volume $V_{SE}$ of the inorganic solid electrolyte is set to increase from the inorganic solid electrolyte layer side toward the collector side.

3. The all solid state secondary battery according to claim 1, wherein the acidic functional group is a carboxyl group, a sulfonic acid group, a phosphoric acid group, or a phosphonic acid group.

4. The all solid state secondary battery according to claim 1, wherein the specific polymer has a particulate shape having a volume-average particle diameter of 0.01 to 20 μm.

5. The all solid state secondary battery according to claim 1, wherein a thickness of the electrode layer is 5 μm or more and 1,000 μm or less.

6. The all solid state secondary battery according to claim 1, wherein the specific polymer has a repeating unit of a macromonomer having a weight-average molecular weight of 1,000 or more as a side chain component.

7. The all solid state secondary battery according to claim 1, wherein the specific polymer includes a repeating unit derived from a monomer selected from (meth)acrylic acid monomers, (meth)acrylic acid ester monomers, (meth)acrylic acid amide monomers, and (meth)acrylonitrile.

8. A solid electrolyte composition which is applied to formation of electrode layers in all solid state secondary batteries, comprising:

an inorganic solid electrolyte having a conductivity of ions of metals belonging to Group I or II of the periodic table;

an active material; and a specific polymer, said specific polymer is selected from an acrylic resin and a urethane resin, and the acrylic resin and the urethane resin contains a repeating unit having an acidic functional group in a content of 5% by mass or more and 20% by mass or less in terms of the acidic equivalent, wherein a measured solid electrolyte layer comprises self-forming properties of 4 or 5 with respect to measured electrolyte thickness of 5 μm or more.

9. The solid electrolyte composition according to claim 8, wherein the acidic functional group is a carboxyl group, a sulfonic acid group, a phosphoric acid group, or a phosphonic acid group.

10. The solid electrolyte composition according to claim 8, wherein the specific polymer has a particulate shape having a volume-average particle diameter of 0.01 to 20 μm.

11. The solid electrolyte composition according to claim 8, wherein a concentration of solid components is 1% by mass or more and 70% by mass or less of a total amount of the solid electrolyte composition.

12. A method for manufacturing an electrode sheet for a battery, comprising:

applying the solid electrolyte composition according to claim 8 onto a collector to form a film.

13. The method for manufacturing an electrode sheet for a battery according to claim 12, further comprising:

eccentrically locating the active material in the bottom collector side and forming an inorganic solid electrolyte layer on the electrode layer by the application of the solid electrolyte composition to obtain a structure of the electrode layer in which a volume ratio $V_E/V_{sE}$ of a total volume $V_E$ of the active material to a total volume $V_S$E of the inorganic solid electrolyte in the electrode layer is increased from the inorganic solid electrolyte layer side toward the collector side.

14. A method for manufacturing an all solid state secondary battery, wherein an all solid state secondary battery is manufactured using the method for manufacturing an electrode sheet for a battery according to claim 12.

15. An electrode sheet for a battery, wherein the solid electrolyte composition according to claim 8 is applied onto a collector to form a film.

16. An all solid state secondary battery comprising:

the electrode sheet for a battery according to claim 15.

17. The all solid state secondary battery according to claim 1, wherein a content of the specific polymer in the electrode layer is 3% by mass or more to 20% by mass or less.

18. The electrode sheet for a battery according to claim 15, wherein the film thickness of the solid electrolyte layer is measured from the cross-section of the electrode sheet observed using SEM.

* * * * *